(12) United States Patent
Bruckman et al.

(10) Patent No.: US 10,044,471 B2
(45) Date of Patent: Aug. 7, 2018

(54) DELIVERING CPRI AND ETHERNET SIGNALS OVER OPTICAL NETWORKS

(71) Applicant: IPLight Ltd., Petach Tikva (IL)

(72) Inventors: Leon Bruckman, Petah-Tikva (IL); Joseph Moshe, Herzliya (IL)

(73) Assignee: IPLight Ltd., Petach Tikva (IL)

( * ) Notice: Subject to any disclaimer, the term of this patent is extended or adjusted under 35 U.S.C. 154(b) by 47 days.

(21) Appl. No.: 15/242,615

(22) Filed: Aug. 22, 2016

(65) Prior Publication Data

US 2017/0063491 A1 Mar. 2, 2017

Related U.S. Application Data

(60) Provisional application No. 62/212,623, filed on Sep. 1, 2015, provisional application No. 62/221,120, filed on Sep. 21, 2015.

(51) Int. Cl.
*H04L 1/00* (2006.01)
*H04L 7/00* (2006.01)
*H04L 25/49* (2006.01)

(52) U.S. Cl.
CPC .............. *H04L 1/0083* (2013.01); *H04L 7/00* (2013.01); *H04L 25/4908* (2013.01)

(58) Field of Classification Search
CPC ..... H04L 1/0083; H04L 25/4908; H04L 7/00; H04B 10/0795; H04J 3/14; H04J 2203/076
See application file for complete search history.

(56) References Cited

U.S. PATENT DOCUMENTS 7,680,149 B2 * 3/2010 Liu .................. H04J 3/1617
370/464
9,332,567 B1 * 5/2016 Ali .................. H04W 24/04
(Continued)

FOREIGN PATENT DOCUMENTS

EP 2434661 A1 4/2010

OTHER PUBLICATIONS

International Application # PCT/IB2014/066962 dated Apr. 19, 2015.
(Continued)

*Primary Examiner* — Shelly A Chase
(74) *Attorney, Agent, or Firm* — D. Kligler IP Services Ltd.

(57) ABSTRACT

A method for passing communications over an Optical Transport Network (OTN) from a first communication interface to a second communication interface. The first interface extracts characters from received data symbols, maps the characters into OTN communication frames and discards the synchronization symbols. The mapping is performed using a Bit-synchronous Mapping Procedure (BMP), while filling some locations in the OTN frames with stuffing characters, so that the rate of the characters matches a desired rate of the OTN communication frames. The characters are extracted from the communication frames in the second communication interface by synchronizing to the mapped input frames independently of the synchronization symbols. The input frames are reconstructed to produce reconstructed input frames including the data symbols and the synchronization symbols, by re-encoding the extracted characters. In some embodiments, data from Ethernet frames is passed along with the extracted characters in the OTN frames.

26 Claims, 10 Drawing Sheets

(56) References Cited

U.S. PATENT DOCUMENTS

| | | |
|---|---|---|
| 2007/0091896 A1 | 4/2007 | Liu |
| 2007/0116046 A1 | 5/2007 | Liu et al. |
| 2009/0180423 A1* | 7/2009 | Kroener .............. H04W 88/085 370/328 |
| 2009/0291681 A1 | 11/2009 | Hara |
| 2012/0113972 A1 | 5/2012 | Liu et al. |
| 2013/0100948 A1 | 4/2013 | Irvine |
| 2014/0241186 A1 | 8/2014 | Garcia |
| 2015/0180575 A1 | 6/2015 | Bruckman |

OTHER PUBLICATIONS

Lanzani, C , "4G Mobile Networks: An Analysis of Spectrum Allocation, Software Radio Architectures and Interfacing Technology", Industrial PhD Thesis, Technical University of Denmark, 202 pages, Oct. 31, 2010.

IEEE Standard 802.3-2005, "Part 3: Carrier sense multiple access with collision detection 5 (CSMA/CD) access method and physical layer specifications", 387 pages, Dec. 12, 2005.

CPRI Specification, "Common Public Radio Interface (CPRI); Interface Specification", version 6.0, 128 pages, Aug. 30, 2013.

ITU-T-G.709N.1331, "Series G: Transmission Systems and Media, Digital Systems and Networks, Digital terminal equipments—General; Series Y: Global Information Infrastructure, Internet Protocol Aspects and Next-Generation Networks, Internet protocol aspects—Transport, Interfaces for the Optical Transport Network 15 (OTN)" , Appendix VIII, 238 pages, Feb. 2012.

ITU-T G-series Recommendations—Supplement 56, "OTN Transport of CPRI signals, Series G: Transmission Systems and Media, Digital Systems and Networks", 20 pages, Jul. 2015.

IEEE 802.3-2008, "Telecommunications and information exchange between systems—Local and metropolitan area networks—Specific requirements Part 3: Carrier Sense Multiple Access with Collision Detection (CSMA/CD) Access Method and Physical 20 Layer Specifications", 315 pages, Dec. 26, 2008.

ITU-T G.7041/Y.1303—Telecommunication Standardization Sector of ITU, G.7041N.1303, Series G: Transmission Systems and Media, Digital Systems and Networks Data over Transport—Generic aspects—General Series Y: Global Information Infrastructure, Internet Protocol Aspects and Next-Generation Networks—Internet protocol aspects—Transport—Generic framing procedure Recommendation, 82 pages, Apr. 2011.

U.S. Appl. No. 14/569,857 Office Action dated Nov. 23, 2016.

\* cited by examiner

MAPPING 6 CPRI-3 SIGNALS TO OPU2r PAYLOAD

| | 15 | 16 | 17 | 18 | 19 | 20 | 21 | 22 | 23 | 24 | ... | 38 | 39 | 40 | 41 | ... | 3823 | 3824 |
|---|---|---|---|---|---|---|---|---|---|---|---|---|---|---|---|---|---|---|
| 1 | BaFN1 | BFP1 | CH1 | CH2 | CH3 | CH4 | CH5 | CH6 | CH1 | CH2 | | CH4 | CH5 | CH6 | CH1 | | CH3 | CH4 |
| 2 | BaFN2 | BFP2 | CH5 | CH6 | CH1 | CH2 | CH3 | CH4 | CH5 | CH6 | | | | | | | | |
| 3 | BaFN3 | BFP3 | | | | | | | | | | | | | | | | |
| 4 | PSI | 0x00 | | | | | | | | | | | | | | | | |
| 1 | BaFN4 | BFP4 | CH5 | CH6 | CH1 | CH2 | CH3 | CH4 | CH5 | CH6 | | | | | | | CH3 | |
| 2 | BaFN5 | BFP5 | | | | | | | | | | | | | | | | |
| 3 | BaFN6 | BFP6 | | | | | | | | | | | | | | | | |
| 4 | PSI | 0x01 | | | | | | | | | | | | | | | | |
| 1 | RES | RES | CH3 | CH4 | CH5 | CH6 | CH1 | CH2 | CH3 | CH4 | | | | | | | CH1 | CH2 |
| 2 | RES | RES | | | | | | | | | | | | | | | | |
| 3 | RES | RES | | | | | | | | | | | | | | | | |
| 4 | PSI | 0x02 | | | | | | | | | | | | | | | CH5 | CH6 |

MAP ETHERNET TO UNUSED CHANNELS

DELIVERING CPRI AND ETHERNET SIGNALS OVER OPTICAL NETWORKS

CROSS-REFERENCE TO RELATED APPLICATIONS

This application claims the benefit of U.S. Provisional Patent Application 62/212,623, filed Sep. 1, 2015, and U.S. Provisional Patent Application 62/221,120, filed Sep. 21, 2015, whose disclosures are incorporated herein by reference.

FIELD OF THE INVENTION

The present disclosure relates generally to communication networks, and particularly to methods and systems for efficient delivery of Common Public Radio Interface (CPRI) and Ethernet signals over an optical network.

BACKGROUND OF THE INVENTION

Various communication networks comprise multiple Base Transmission Station (BTS) sites that transmit and receive Radio Frequency (RF) signals to and from mobile devices using one or more antennas. In various network configurations, the BTS sites communicate the RF signals with other elements in the network in a sampled and digitized form. For example, the Common Public Radio Interface (CPRI) standard defines interfaces between Radio Equipment Controllers (REC) and local or remote Radio Equipment (RE) units of the BTS sites. The CPRI specifications are described, for example, in "Common Public Radio Interface (CPRI); Interface Specification," version 6.1, Jul. 1, 2014, whose disclosure is incorporated herein by reference.

In various applications, CPRI signals are transmitted as 10-bit symbols using an encoding scheme that maps 8-bit characters to the 10-bit symbols (referred to as 8b/10b encoding). An 8b/10b line coding scheme is defined, for example, in IEEE Standard 802.3-2005, entitled "IEEE Std 802.3-2005: Part 3: Carrier sense multiple access with collision detection (CSMA/CD) access method and physical layer specifications," Dec. 12, 2005, whose disclosure is incorporated herein by reference.

Some high rate CPRI signals use a 64b/66b line coding scheme in which 64-bit blocks (i.e., eight 8-bit characters) are mapped into 66-bit line codes. A 64/66b line coding scheme is defined, for example, in clause 49 of the IEEE standard 802.3-2008, entitled "Telecommunications and information exchange between systems—Local and metropolitan area networks—Specific requirements Part 3: Carrier Sense Multiple Access with Collision Detection (CSMA/CD) Access Method and Physical Layer Specifications," Dec. 26, 2008, whose disclosure is incorporated herein by reference.

CPRI signals may be sent over various types of networks, such as, for example, optical networks. Several schemes for sending CPRI signals over the Optical Transport Network (OTN) are described, for example, in ITU-T G-series Recommendations—Supplement 56, entitled "OTN Transport of CPRI signals, Series G: Transmission Systems and Media, Digital Systems and Networks," July, 2015, whose disclosure is incorporated herein by reference.

SUMMARY OF THE INVENTION

An embodiment that is described herein provides a method for communication that includes receiving in a first communication interface input frames, which include data symbols derived by encoding respective characters, and one or more synchronization symbols distinguishable from the data symbols. The characters are recovered from the data symbols, and transmitted to a second communication interface by mapping the characters into communication frames and discarding the synchronization symbols, wherein a protocol for delivering the characters supports a mapping scheme for delivering the characters at a first data rate, and mapping the characters includes mapping the characters so as to deliver the characters at a second data rate lower than the first data rate. The characters are extracted from the communication frames in the second communication interface by synchronizing to the mapped input frames independently of the synchronization symbols. The input frames are reconstructed to including the data symbols and the synchronization symbols, by re-encoding the extracted characters.

In some embodiments, the data symbols are carried in Common Public Radio Interface (CPRI) signals and are derived from eight-bit characters using a 64-bit to 66-bit (64b/66b) encoding protocol, and transmitting the recovered characters includes transmitting the communication frames, with the recovered characters mapped therein, over an optical communication network. In other embodiments, mapping the characters includes mapping the input frames to payload areas of the communication frames, and setting in overhead fields of the communication frames pointers to at least some of the mapped input frames. In yet other embodiments, synchronizing to the mapped input frames includes identifying respective positions of the input frames within the payload areas of the communication frames using the pointers.

In an embodiment, receiving the input frames includes receiving hyper frames that each includes multiple input frames, discarding the synchronization symbols includes setting in place of the synchronization symbols an alarm signal that indicates a failure in the input frames, or a number of errors detected in a previous hyper frame, and reconstructing the input frames includes reconstructing the input frames, including regenerating the synchronization symbols, when the alarm signal indicates no failures in the input frames or when the number of errors detected is zero, and outputting a fault indication otherwise. In another embodiment, the method includes deriving from the input frames received in the first communication interface a first clock signal, further deriving from the communication frames received in the second communication a second clock signal, wherein transmitting the communication frames includes outputting the communication frames from the first communication interface using the first clock, and reconstructing the input frames in the second communication interface includes sending the reconstructed input frames using the second clock.

There is additionally provided, in accordance with an embodiment that is described herein, an apparatus for communication, including a first communication interface and a second communication interface. The first communication interface is configured to receive input frames, which include data symbols that were derived by encoding respective characters, and further include one or more synchronization symbols distinguishable from the data symbols, to recover the characters from the data symbols, and to transmit the recovered characters by mapping the characters into communication frames and discarding the synchronization symbols, wherein a protocol for delivering the characters supports a mapping scheme in which the characters are delivered at a first data rate, and the first communication interface is configured to map the characters so as to deliver the characters at a second data rate that is lower than the first data rate. The second communication interface is configured to receive the communication frames from the first communication interface, to extract the characters from the communication frames by synchronizing to the mapped input frames independently of the synchronization symbols, and to reconstruct the input frames to produce reconstructed input frames, including the data symbols and the synchronization symbols, by re-encoding the extracted characters.

There is additionally provided, in accordance with an embodiment that is described herein, a method for communication that includes receiving in a first communication interface input frames, which include data symbols that were derived by encoding respective first characters, and further include one or more synchronization symbols distinguishable from the data symbols, and further receiving in the first communication interface Ethernet frames that encapsulate second characters. The first characters are recovered from the data symbols and the second characters are recovered from the Ethernet frames. The recovered first and second characters are transmitted to a second communication interface by mapping the first and second characters into communication frames and discarding the synchronization symbols, wherein mapping the second characters includes replacing first characters that carry no information with the second characters. The first and second characters are extracted from the communication frames in the second communication interface by synchronizing to the input frames independently of the synchronization symbols. The input frames are reconstructed in the second communication interface, including the data symbols and the synchronization symbols, by re-encoding the extracted first characters, and further reconstructing in the second communication interface the Ethernet frames by re-encapsulating the extracted second characters into the Ethernet frames.

There is additionally provided, in accordance with an embodiment that is described herein, an apparatus for communication that includes a first communication interface and a second communication interface. The first communication interface is configured to receive input frames, which include data symbols that were derived by encoding respective first characters, and further include one or more synchronization symbols distinguishable from the data symbols, and further receive Ethernet frames that encapsulate second characters, to recover the first characters from the data symbols and recover the second characters from the Ethernet frames, and to transmit the recovered first and second characters by mapping the first and second characters into communication frames and discarding the synchronization symbols, wherein mapping the second characters includes replacing first characters that carry no information with the second characters. The second communication interface is configured to receive the communication frames from the first communication interface, to extract the first and second characters from the communication frames by synchronizing to the input frames independently of the synchronization symbols, and to reconstruct the input frames in the second communication interface, including the data symbols and the synchronization symbols, by re-encoding the extracted first characters, and further reconstruct the Ethernet frames by re-encapsulating the extracted second characters into the Ethernet frames.

The present invention will be more fully understood from the following detailed description of the embodiments thereof, taken together with the drawings in which:

BRIEF DESCRIPTION OF THE DRAWINGS

FIGS. 6 and 7 are diagrams depicting tables for mapping CPRI option-3/4/5 channels plus Ethernet signals into an OPU2r structure, in accordance with embodiments that are described herein;

FIGS. 9 and 10 are diagrams depicting tables for mapping CPRI option-7/7a/8 channels plus Ethernet signals into an OPU2r structure, in accordance with embodiments that are described herein.

DETAILED DESCRIPTION OF EMBODIMENTS

Overview

Figure 1:
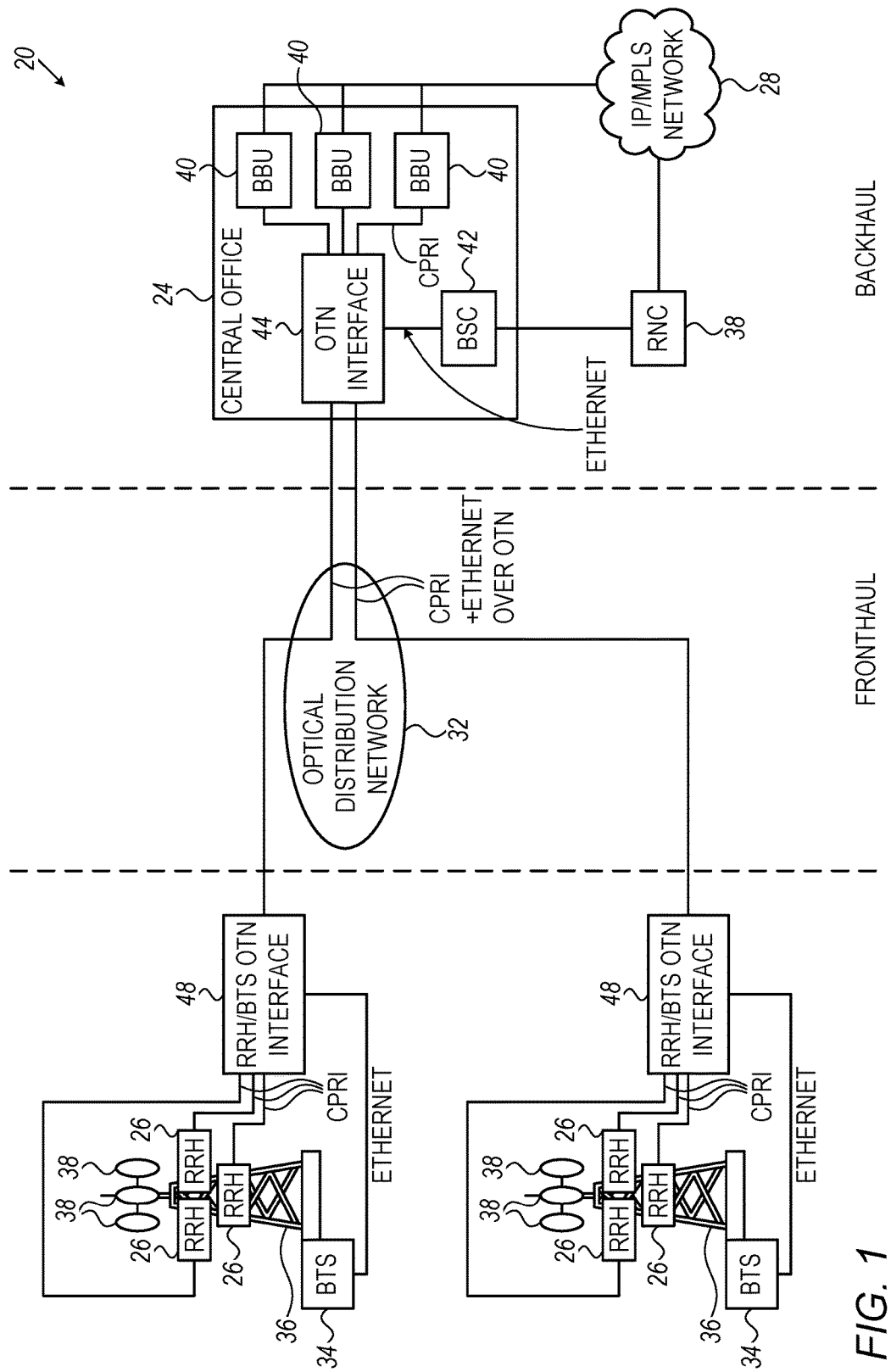
FIG. 1 is a block diagram that schematically illustrates a communication network that delivers Common Public Radio Interface (CPRI) and Ethernet signals over an Optical Transport Network (OTN), in accordance with an embodiment that is described herein.

Various communication networks comprise multiple base station sites that are connected to a central office. In large scale deployments, in which the distance between the base station sites and the central office is typically on the order of 10-30 Km, connecting each antenna having a dedicated base station controller separately to the central office becomes cost prohibitive. One approach to reduce the cost is to install a Remote Radio Head (RRH) per antenna, and to implement the control functionality of the base stations, for multiple antennas, within (or close to) the central office.

A RRH unit is typically designed to convert between the Radio Frequency (RF) signals at the antenna and a sampled and digitized form of the RF signals. A Base Band Unit (BBU) or a pool of BBUs (or virtual BBUs) at the central office implements the base station controller functionality for the RRHs of one or more base station sites. In the RRH, the RF signals can be sampled and digitized into CPRI signals, for example, in accordance with the CPRI specifications cited above.

The BBU and RRHs may communicate the CPRI signals over any suitable network, such as an optical network. The optical network may comprise, for example, an OTN network, as described, for example, in accordance with ITU-T Recommendation G.709/Y.1331, entitled "Interfaces for the Optical Transport Network (OTN)," February, 2012, whose disclosure is incorporated herein by reference. A CPRI signal associated with a given BBU-to-RRH (or RRH-to-BBU) connection is also referred to herein as a CPRI channel or a CPRI source.

In some communication systems, a Base Transceiver Station (BTS) module, typically located at the bottom of the antenna tower, converts between RF signals received and transmitted via the antennas and digitized Ethernet signals. The BTS module communicates the Ethernet signals with a Base Station Controller (BSC) located at the central office over the network.

Embodiments of the present invention that are described herein provide methods and systems for efficient delivery of CPRI signals and multiplexed CPRI and Ethernet signals over an optical network. In some embodiments, an OTN interface at the central office and a RRH/BTS interface at the BTS site interface the CPRI and Ethernet signals for delivery over the optical network.

The disclosed techniques allow delivering high-rate CPRI signals over an OTN network that supports a limited data rate. In addition, the disclosed techniques employ mapping schemes for sending the CPRI and/or CPRI plus Ethernet signals over OTN, which are not supported in CPRI specifications.

In some embodiments, the OTN interface receives from the BBU CPRI signals comprising data symbols that were derived by applying line encoding to the respective characters. The CPRI rate options are denoted option-1 . . . option-9. CPRI signals having a higher rate option, typically deliver data at higher rates. In some embodiments, the OTN interface at the central office additionally receives Ethernet signals from the BSC for delivery to a remote BTS over the OTN.

In accordance with the CPRI specifications cited above, prior to line encoding, the characters comprise data bytes (i.e., 8-bit characters), and the encoding scheme being used depends on the CPRI rate option. For example, for CPRI rate options 3, 4, 5 and 7, the encoding scheme comprises an 8-bit to 10-bit (8b/10b) line coding scheme that maps 8-bit charters to 10-bit encoded symbols. For CPRI rate options 7a, 8 and 9, the encoding scheme comprises a 64b/66b line coding scheme that maps 64-bit (i.e., eight 8-bit characters) data blocks to 66-bit encoded symbols.

The CPRI specifications further define a frame hierarchy in which the data symbols of a CPRI signal (or the respective characters) are organized in basic frames, hyper frames and CPRI frames. Thus, a CPRI frame comprises 150 hyper frames, and a hyper frame comprises 256 basic frames. The $64^{th}$ basic frame in a hyper frame carries a Hyper Frame Number (HFN), which is a sequential cyclic counter in the range 0 . . . 255. Note that the disclosed techniques are not limited to the CPRI signal and frame hierarchy definitions described above, and any other suitable signal structure and frame hierarchy can also be used.

The encoding of 8-bit characters to 10-bit data symbols (using the 8b/10b encoding scheme) does not use all possible 10-bit symbols, and therefore leaves room for 10-bit symbols that have no corresponding characters. Similarly, encoding 64-bit data block to 66-bit encoded symbols leaves room for control 66-bit encoded blocks that are distinguishable from 66-bit data blocks. Such encoded symbols or blocks may be used for control and synchronization. For example, the first 10-bit symbol in the 8b/10b scheme or the two first 66-bit blocks in the 64b/66b scheme in each CPRI hyper frame serves for frame synchronization, in accordance with the CPRI specifications.

In some embodiments, the OTN interface recovers the characters from the data symbols, discards the synchronization symbol(s) and maps the characters into communication frames of the OTN. In the 8b/10b encoding scheme, mapping the raw 8-bit characters instead of the 10-bit symbols provide a considerable reduction in overhead. In an embodiment, the OTN interface inserts, in place of the discarded synchronization symbol(s) an alarm indication character that indicates error events relating to the CPRI signal, or the number of error detected in a previous hyper frame.

In some embodiments, the OTN interface maps the Ethernet signals received from the BSC using a Generic Framing Procedure (GFP) and sends the GFP frames over unused CPRI characters. For example, in some embodiment, CPRI option-3 and option-5 signals that carry up to six or three CPRI channels, respectively, are interleaved, and the Ethernet signals are delivered over interleaved CPRI channels that are not used for carrying information. In other embodiments, CPRI options 4, 7, 7a and 8 signals are padded with stuffing characters to match a desire data rate, and the Ethernet signals (e.g., carried in GFP frames) can be delivered over the stuffing characters.

The RRH/BTS interface receives the OTN communication frames, and synchronizes to the CPRI basic frames and hyper frames independently of the 10-bit or 66-bit synchronization symbol (which was discarded.) The RRH/BTS interface typically reconstructs the CPRI signal, including both the data symbols and the discarded synchronization symbols, by re-encoding the extracted characters, and sends the reconstructed CPRI signal to the RRH. The BBU and RRH communicate CPRI signals conventionally and are unaware of the efficient delivery of the CPRI signals over the optical network.

In the embodiments in which the communication frames carry multiplexed CPRI and Ethernet signals, the RRH/BTS interface separates between the Ethernet signals and the CPRI signals, recovers the Ethernet frames using inverse GFP mapping and sends the Ethernet frames to the BTS module.

In some embodiments, depending on the CPRI rate option, one or more CPRI signals are mapped using a Bit-synchronous Mapping Procedure (BMP), possibly with additional stuffing characters, into an OTN structure. A pointer or offset to the first full basic frame of each such CPRI signal is set in the overhead area of the OTN frames. When receiving OTN communication frames from the network, the OTN and RRH/BTS interfaces use these pointers for synchronizing to the basic frames within the OTN frames, independently of the synchronization symbol.

In some embodiments, to synchronize to the CPRI hyper frames, the (BBU or RRH) interface first identifies the basic frames that carry the HFN and then infers the boundaries of the hyper frames from the position of these basic frames within the hyper frames.

In principle, each of the OTN and RRH/BTS interfaces could generate a local clock signal (i.e., independently from the clock of the CPRI signals) for transmitting the OTN frames to the network, and recover, from the payload of the received OTN frames, a clock signal for transmitting CPRI signals towards the BBU and RRH. Such schemes, however, would result in large momentary deviations of frequency and/or phase from their true values (also referred as wander) in the recovered clock signal, which may result in errors or otherwise degraded performance. An analysis of this clocking problem for OTN mapped client is described, for example, in supplement 56 of the ITU-T series G specifications cited above.

In some of the disclosed embodiments, the OTN interface recovers the CPRI clock from the CPRI basic frames sent by the BBU, and uses this recovered clock for transmitting the OTN frames to the network. The RRH/BTS interface recovers the CPRI clock from the received OTN frames and uses the recovered CPRI clock for sending the reconstructed CPRI signals towards the RRH. In the RRH-to-BBU direction, the RRH/BTS and OTN interfaces employ loopback timing techniques based on the recovered clock signals. This is possible since the RRH recovers a clock signal from the CPRI signal received from the RRH/BTS interface, and uses this recovered clock to transmit the CPRI signals toward the antennas.

The disclosed techniques provide delivery of high rate CPRI signals over OPU2 structures. For example, CPRI option-8 and option-9 signals are carried over OPUflex and OPU2 structures, respectively. In addition, the disclosed techniques provide delivery of Ethernet signals over OTN by multiplexing the Ethernet signals with CPRI signals. The Ethernet signals are carried over unused CPRI channels or over stuffing characters of the CPRI channels.

System Description

FIG. 1 is a block diagram that schematically illustrates a communication network 20 that delivers Common Public Radio Interface (CPRI) and Ethernet signals over an Optical Transport Network (OTN), in accordance with an embodiment that is described herein. Network 20 comprises a central office 24, which connects to an IP over Multi-Protocol Label Switching (IP/MPLS) network 28. Central office 24 communicates CPRI signals that carry the IP/MPLS data with multiple Remote Radio Head (RRH) units 26 over a network 32. The central office additionally communicates Ethernet signals with multiple Base Transceiver Station (BTS) modules 34 over network 32. The distance between the central office and the RRHs is typically on the order of 10 Km-30 Km, but smaller or larger distances are also possible.

Communication system 20 may comprise any suitable communication network, using any suitable technology, such as, for example, GSM, Code Division Multiple Access (CDMA), Universal Mobile Telecommunications System (UMTS), Long Term Evolution (LTE), or LTE Advanced (LTE-A). The part of network 20 comprising the IP/MPLS network and the central office is also referred to as a backhaul network. The part of network 20 comprising network 32 is also referred to as a front-haul network. In some embodiments, network 32 comprises an optical distribution network, such as, for example, an Optical Transport Network (OTN). OTN is described, for example in the ITU-T Recommendation G.709/Y.1331 cited above.

System 20 comprises multiple BTS towers 36, on top of which one or more Radio Frequency (RF) antennas 38 are mounted. Typically, RRH units 26 are mounted close to respective antennas 38, whereas BTS modules 34 are located at the bottom of tower 36 and connect to antenna 38 using suitable cables. BTS module 34 is also referred to as "NodeB" (or NB) in 3G network, and as "evolved NB" (eNB) in Long Term Evolution (LTE) networks.

In the example system of FIG. 1, each BTS tower 36 comprises three directional antennas 38, thus implementing a three-cell base station site. In alternative embodiments, each base station site comprises up to six sectors. Further alternatively, any other suitable number of sectors per base station site can also be used.

RRH 26, which is also referred to as a Radio Equipment (RE) unit, typically comprises RF circuitry connected to antenna 38, as well as up/down converters and analog-to-digital/digital-to-analog converters (not shown) for converting between the RF signals at the antenna and a sampled and digitized version of the RF signals.

In the present example, BTS module 34 comprises a transceiver for transmitting and receiving Ethernet signals via antenna 38. A Base Station Controller (BSC) in the central office controls BTS modules 34 over network 32, and connects to IP/MPLS network 28 via a Radio Network Controller (RNC) 38.

Central office 24 comprises an OTN interface 44, which interfaces between the OTN network and the BSC and a pull of Base Band Units (BBU) 40 in the central office. In the BBU to RRH direction and in the BSC to BTS direction, OTN interface 44 receives CPRI signals from the BBUs, and further receives Ethernet signals from the BSC, maps and multiplexes the Ethernet and CPRI signals into communication frames suitable for communication over network 32, and sends the multiplexed CPRI plus Ethernet signals to network 32. In the opposite RRH to BBU direction and in the opposite BTS to BSC direction, OTN interface 44 receives from network 32 communication frames comprising multiplexed CPRI and Ethernet signals, de-multiplexes and de-maps the communication frames to extract the CPRI and Ethernet signals, and delivers the CPRI signals to the BBUs and the Ethernet signals to the BSC.

Among other tasks, BSC 42 converts data received from the IP/MPLS network via the RNC to Ethernet signals to be sent to the BTS via network 32, and converts Ethernet signals received from the BTS via network 32 to a data format suitable for delivery to the IP/MPLS network.

In some embodiments, for certain CPRI options, the OTN interface communicates with the RRH/BTS interface CPRI signals without multiplexing any Ethernet signals. In these embodiments, high rate option CPRI signals are mapped to OPUflex or OPU2r structures.

Each BBU 40 and a respective RRH with which it communicates (and similarly the BSC and a BTS with which it communicates) can be viewed as a distributed implementation of a Base Station (BS) in network 20. Among other tasks, BBU 40 converts data received from the IP/MPLS network to CPRI signals to be sent to the RRHs via network 32, and converts CPRI signals received from the RRHs via network 32 to a data format suitable for delivery to the IP/MPLS network.

System 20 additionally comprises multiple RRH/BTS OTN interface units 48 that interface between network 32 and RRHs 26 and BTS module 34 at the BTS sites. In the BBU to RRH direction and in the BSC to BTS direction, RRH/BTS OTN interface 48 extracts the CPRI and Ethernet signals from the communication frames received from network 32, and sends the extracted CPRI signals to a respective RRH 26 and additionally sends the extracted Ethernet signals to BTS module 34. In the RRH to BBU direction and in the BTS to BSC direction, RRH/BTS OTN interface 48 receives CPRI signals from a given RRH 26 and Ethernet signals from BTS module 34, maps and multiplexes the CPRI signals and the Ethernet signals into communication frames of network 32 and sends the communication frames via network 32 to respective BBU 40 and BSC 42.

The configuration of communication system 20 in FIG. 1 is given by way of example, and in alternative embodiments any other suitable system configuration can also be used. For example, although in FIG. 1 each base station site comprises three RRH units, in alternative embodiments a base station site may comprise any other suitable number of RRHs, and different base station sites may comprise a different number of RRHs.

Although in the example of FIG. 1 the RNC resides outside the central office, in alternative embodiments, the functionality of the RNC may be implemented in combination with the functionality of the BSC, within the central office. Further alternatively, both the BSC and RNC may reside outside the central office as separate modules or as a unified module.

CPRI Frame Hierarchy and Structure

Figure 2:
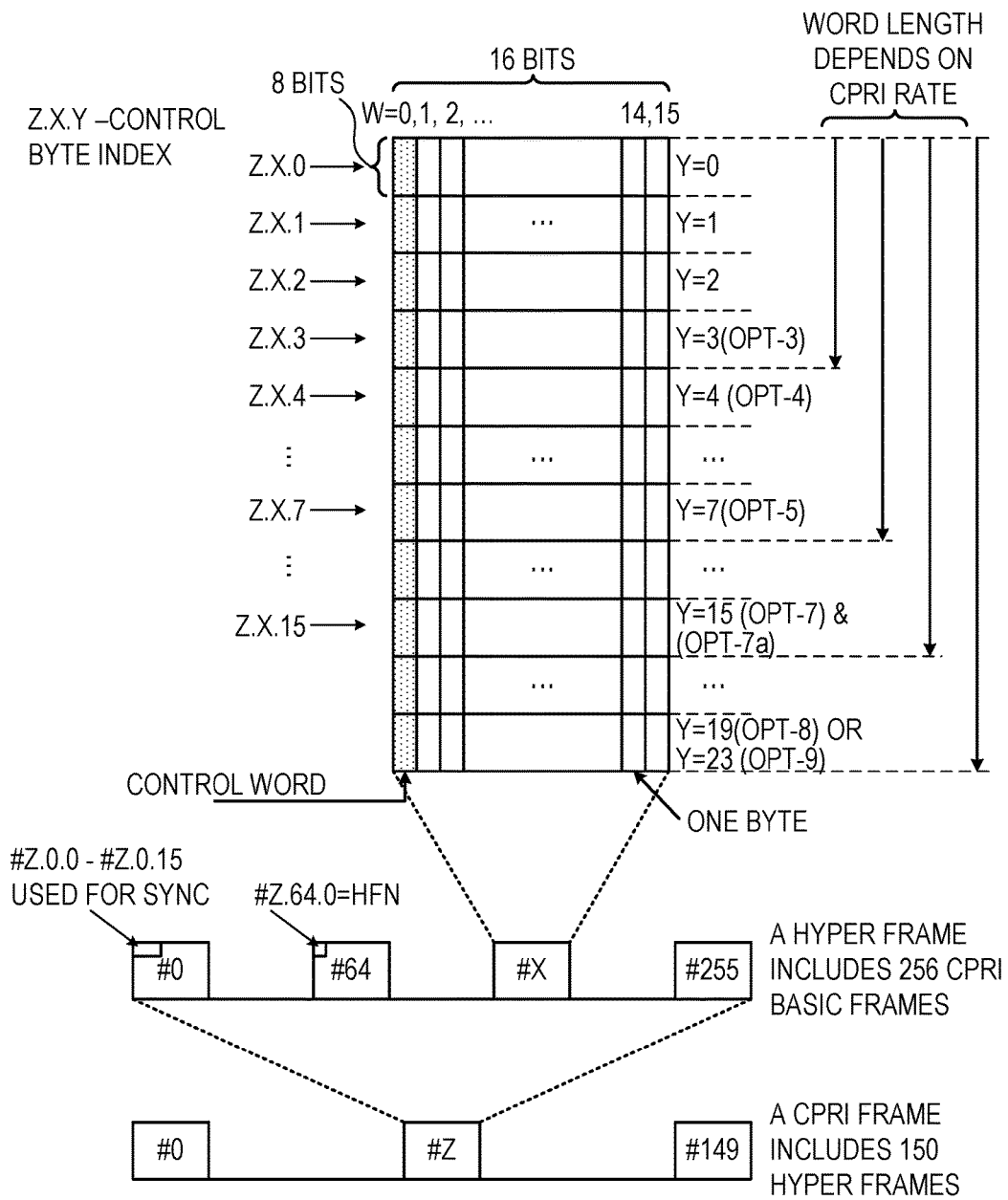
FIG. 2 is a diagram that schematically depicts CPRI frame hierarchy, in accordance with an embodiment that is described herein.

FIG. 2 is a diagram that schematically depicts CPRI frame hierarchy, in accordance with an embodiment that is described herein. As seen in FIG. 2, CPRI signals are delivered in a hierarchical framing structure. In accordance with the CPRI specifications cited above, a CPRI frame comprises 150 hyper frames that are indexed by the letter Z, a hyper frame comprises 256 basic frames that are indexed by the letter X, and a basic frame comprises sixteen words that are indexed by the letter W. Each word comprises one or more bytes (depending on the CPRI rate option) that are indexed by the letter Y. The word indexed by W=0 (or part thereof) comprises a control word.

As noted above, the number of bytes per word depends on the CPRI rate option. For example, in a basic frame of a CPRI option-3 signal, each word comprises four bytes, i.e., Y=0 . . . 3. As another example, in a basic frame of a CPRI option-9 signal, each word comprises 24 bytes, i.e., y=0 . . . 23. Table 1 below summarizes several word sizes and control word sizes corresponding to various CPRI rate options. In accordance with the CPRI specifications, the frame-rate of the basic frames is 3.84 Mhz. Alternatively, any other suitable frame-rate can also be used.

TABLE 1

CPRI word sizes for selected rate options

| CPRI rate option | Line bit rate [Mbit/sec] | #bytes per word in a basic frame | #total bytes per basic frame | Control word length |
|---|---|---|---|---|
| Option-1 | 614.4 | 1 | 16 | 1 |
| Option-2 | 1228.8 | 2 | 32 | 2 |
| Option-3 | 2457.6 | 4 | 64 | 4 |
| Option-4 | 3072.0 | 5 | 80 | 5 |
| Option-5 | 4915.2 | 8 | 128 | 8 |
| Option-7 | 9830.4 | 16 | 256 | 16 |
| Option-7a | 8110.08 | 16 | 256 | 16 |
| Option-8 | 10137.6 | 20 | 320 | 16 |
| Option-9 | 12165.12 | 24 | 384 | 16 |

The bytes of the control word, which are also referred to herein as control bytes, are assigned indices Z.X.Y, wherein Z and X refer to the CPRI frame index and the hyper frame index, respectively, and Y refers to a respective byte within the control word. For example, in CPRI option-3, the words comprise four bytes, and the control byte indices are denoted Z.X.0, Z.X.1, Z.X.2 and Z.X.3. The length of the control word can be shorter than the word length. For example, in CPRI option-8 and option-9, the words in the basic frame comprise 20 and 24 bytes, respectively, whereas each of the respective control words comprise 16 bytes whose indices occupy the range Z.X.0 . . . Z.X.15.

The CPRI specifications cited above, define the usage of two invertible line coding mapping schemes. A scheme that is referred to as 8b/10b scheme maps between 8-bit characters (i.e., bytes) of the basic frame and 10-bit CPRI data symbols to be sent over the network. The 8-bit to 10-bit mapping is used for example, in CPRI rate options 3, 4, 5, and 7. The 8b/10b encoded CPRI data symbols utilize only 512 of the possible 1024 10-bit values. One or more of the remaining 512 10-bit values are used for synchronization and control. The other line coding scheme, referred to as a 64b/66b scheme, maps 64-bit blocks of the basic frame to 66-bit line codes for transmission over the line. The 64b/66b mapping scheme is used in CPRI rate options 7a, 8 and 9.

As described above, the first word in the basic frame contains a control word that is used for synchronization. For example, in accordance with the CPRI specifications cited above, when using the 8b/10b line coding scheme, byte Z.X.0 of the first basic frame in a hyper frame (i.e., Z.0.0) comprises a synchronization symbol denoted K28.5, which marks the hyper frame start. When using the 64b/66b line coding scheme (for rate options 7a, 8 and 9), the first two 66-bit encoded blocks in a hyper frame are used for indicating the hyper frame start.

Table 2 depicts 64b/66b line coding formats based on Table 24 of the CPRI V6.1 specifications cited above.

TABLE 2

64b/66b line coding formats

|  | Sync | Block Payload | | | | | | | |
|---|---|---|---|---|---|---|---|---|---|
| First Bit | 0 | 2 | 10 | 18 | 26 | 34 | 42 | 50 | 58 |
| Last Bit | 1 | 9 | 17 | 25 | 33 | 41 | 49 | 57 | 65 |
| Data Block format | | | | | | | | | |
| D0 . . . D7 | 01 | D0 | D1 | D2 | D3 | D4 | D5 | D6 | D7 |
| Control Block Formats | | | | | | | | | |
| D0 . . . D6, T7 | 10 | 0xFF | D0 | D1 | D2 | D3 | D4 | D5 | D6 |
| S0, D1 . . . D7 | 10 | 0x78 | D1 | D2 | D3 | D4 | D5 | D6 | D7 |

As depicted in Table 2, in accordance with the 64b/66b scheme, a 66-bit encoded block comprises two sync bits and a 64-bit block payload. Encoded data blocks start with sync="01", whereas blocks that carry control characters (also referred to herein as "control blocks") start with sync="10". A 64-bit data block D0 . . . D7 is mapped to bits 2 . . . 65 of the 66-bit block. Mapping a control block depends on the block type, which has possible values 0xFF or 0x78. When the block format equals 0xFF, a termination control character/T/=0xFD is positioned in the last 8 bits of the 64-bit payload. When using the block format equals 0x78, a start control character/S/=0xFB is positioned in the first 8 bits of the 64-bit payload. For both the data and control formats, the block payload is typically scrambled.

In accordance with the CPRI specifications cited above, the control byte 2.64.0 (i.e., in the control word of the basic frame whose index in the hyper frame is 64) holds the Hyper Frame Number (HFN) i.e., the value Z. Note that 0≤Z≤149, and therefore the HFN can be represented by a single byte.

In the disclosed techniques, the CPRI signals are sent over network 32 after stripping the line coding with which the CPRI signals are received. When the 8b/10b encoding scheme is used, 10-bit symbols are sent instead of 8-bit characters, which achieves a 20% reduction in the data rate over the network. Similarly, the 64b/66b encoding scheme achieves about 3% reduction in the data rate.

In the 8b/10b encoding scheme, the 8-bit characters are recovered from the 10-bit symbols and mapped into communication frames to be sent over network 32. Moreover, since only 8-bit characters are sent over the network, the synchronization symbol K28.5 is discarded and alternative synchronization mechanisms are employed, as will be described below. In some embodiments, instead of sending the synchronization symbol K28.5 for the control byte Z.0.0, the control byte Z.0.0 uses for delivering an alarm signal as will be described below.

In the 64b/66b scheme, eight 8-bit characters are recovered from a 66-bit encoded block and mapped into communication frames for sending over network 32. In this case the synchronization on the hyper frames is based on 66-bit control blocks that carry the /T/ and /S/ control characters. The first character of these 66-bit blocks is discarded and is replaced with a zero byte or with a byte set to the number of error detected in a previous hyper frame.

The CPRI frame hierarchy configuration in FIG. 2 is given by way of example. In alternative embodiments any other suitable frame hierarchy can also be used. For example, using the K28.5 symbol as a synchronization symbol at byte Z.0.0 (or Z.0.0 . . . Z.0.15 in 64b/66b encoding) and using byte Z.64.0 for holding the HFN is not mandatory, and any other suitable settings are also possible.

Figure 3:
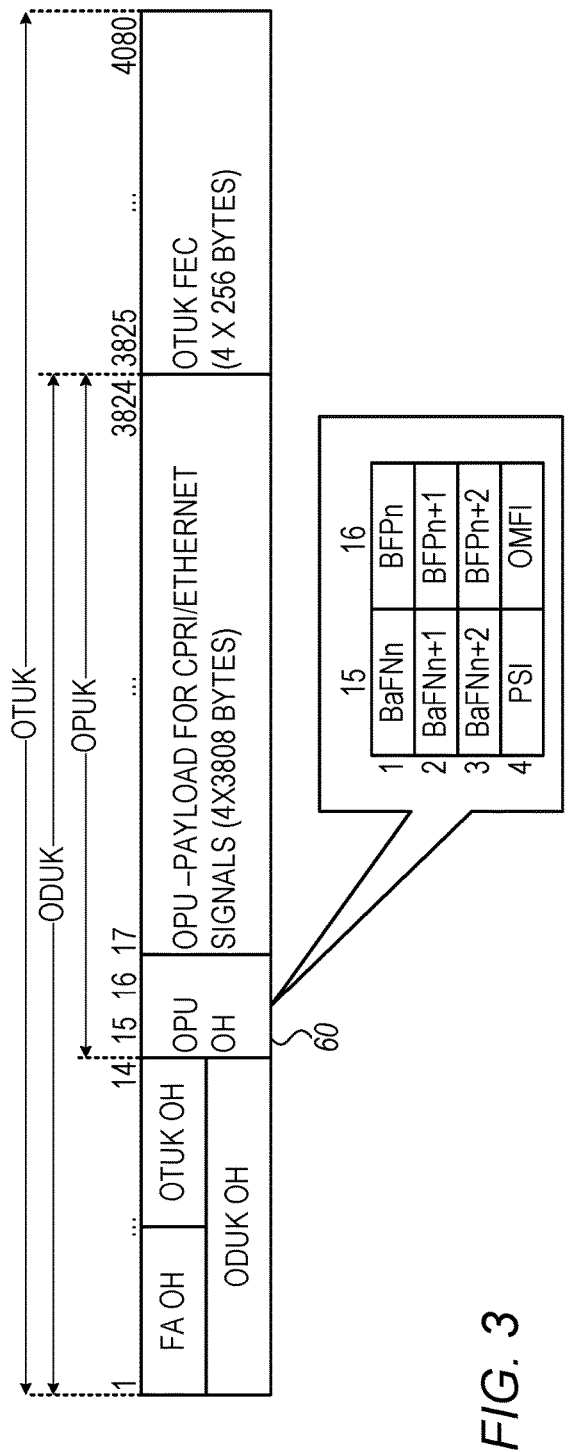
FIG. 3 is a diagram that schematically depicts OTN frame hierarchy and its usage in delivering CPRI signals, in accordance with an embodiment that is described herein.

FIG. 3 is a diagram that schematically depicts OTN frame hierarchy and its usage in delivering CPRI signals, in accordance with an embodiment that is described herein. The structure and hierarchy of OTN frames is defined, for example, in the ITU-T Recommendation G.709/Y.1331 cited above. FIG. 3 depicts three basic OTN information structures that respectively define the optical channel-payload unit (OPUK), data unit (ODUK), and transport unit (OTUK). Variants of the ODU2 structure, referred to as ODU2r and ODUflex are described, for example, in supplement 56 of the ITU-T series G specifications cited above. In the context of the present patent application the OPUK, ODUK and OTUK structures (as well as OPU2r and OPUflex and their higher structures) are collectively referred to as OTN structures or OTN frames.

The OTUK frame is organized as a rectangle structure having four lines and 4080 columns. The first 3824 columns of the OTUK frame comprise an ODUK frame, and the remaining 3825-4080 columns comprise a Forward Error correction Code (FEC) of the OTUK frame, e.g., a Reed-Solomon (RS) FEC code.

Columns 1-14 of the ODUK frame comprise an ODUK Overhead (OH) area, an OTUK OH area and a Frame Alignment (FA) OH area. The overhead areas of the OTUK and ODUK frames typically carry information regarding alarm indications, error monitoring, maintenance signals and protection switch control channels.

Columns 17-3824 of the OTUK frame comprise the OPU payload area, which carries CPRI signals and/or other signals such as Ethernet signals, and columns 15-16 comprise a respective OPU overhead area 60. The Payload Structure Identifier (PSI) byte typically transports a 256-byte PSI signal over multiple ODUK frames. The Multi-Frame Identifier (OMFI) byte in column 16 is typically used as a frame counter in a multi-frame OTN structure. For example, in some of the embodiments that are disclosed below the OMFI byte serves as a frame counter in an OTN multi-frame structure that comprises multiple OTN frames in a multi-frame, such as, for example, three OTN frames per a multi-frame, as will be described below.

In some embodiments, the first three bytes in column (within OPU OH 60) are denoted BFPn, BFPn+1 and BFPn+2, and the first three bytes in column 15 are denoted BaFNn, BaFNn+1 and BaFNn+2. The BFPi values are used as pointers to CPRI basic frames within the OPU area, whereas the BaFNi values indicate the respective CPRI basic frame numbers. In some embodiments, the BFPn value represents the number of bytes mapped into the OPUK payload for a CPRI channel (n), in the frame (in the OTN multi-frame) for which OMFI=0x00, before a full CPRI basic frame of this channel starts. In an embodiment, a different number of CPRI signals (or channels) are carried in the OPU area, depending on the CPRI rate option. In some embodiments, the concatenation of two BFPi bytes is used for representing pointers or offset values higher than 256, for example, in mapping CPRI option 8 or 9 signals. In some embodiments, unused BFPn and BaFNn bytes are considered as reserved bytes (also denoted RES) and are set to 0x00, or to any other suitable value. For example, unused BFPn may duplicate used BFPn values to reduce detection time at the receiving side.

Delivering CPRI Option-8 and CPRI Option-9 Signals Over OTU2 and OTU2R Structures System 20 of FIG. 1 comprises a centralized architecture for accessing the radio network. Such architecture typically supports up to 10 Gbps data rates that can be delivered over the OTN network by mapping CPRI signals to OTU2 or ODU2r structures.

Section 7 of supplement 56 of the ITU-T series G specifications cited above provides methods for mapping CPRI option-8 signals and CPRI option-9 signals into ODUflex structures using a Bit-synchronous Mapping Procedure (BMP), as specified, for example in clause 17.9 of the ITU-T Recommendation G.709/Y.1331 cited above. This OPUflex signal, however, requires more than eight 1.25 G tributary slots and therefore can only be delivered over OPU3 or higher order structures, i.e., at data rates of at least 40 GBps, which may be beyond the capabilities of system 20.

Figure 4:
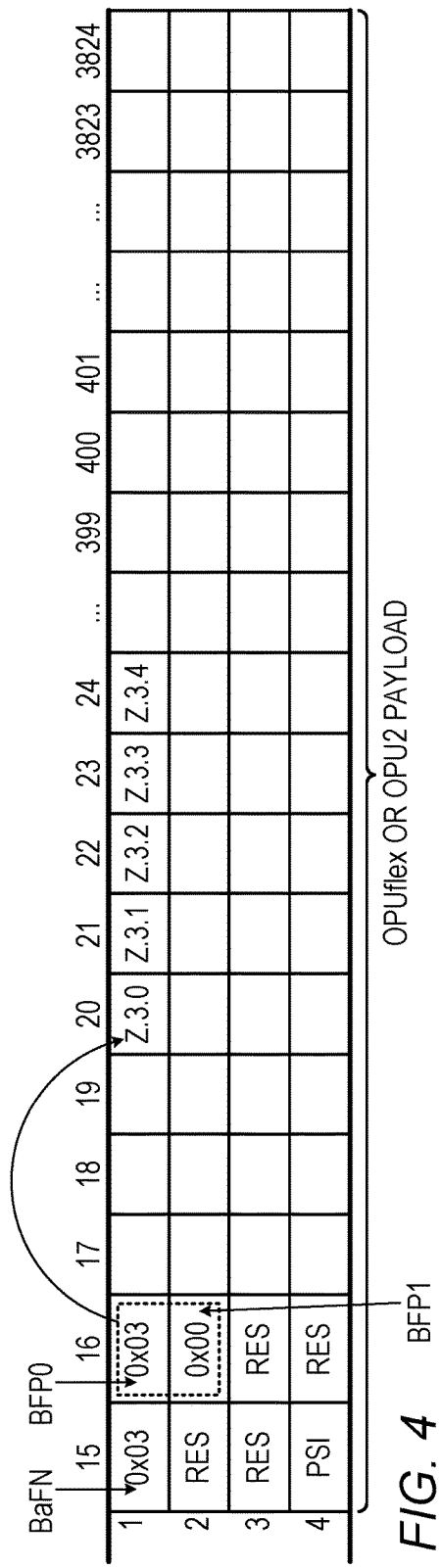
FIG. 4 is a diagram depicting a table for mapping a CPRI option-8 channel and a CPRI option-9 channel into respective OPUflex and OPU2 structures, in accordance with embodiments that are described herein.

FIG. 4 is a diagram depicting a table for mapping a CPRI option-8 channel and a CPRI option-9 channel into respective OPUflex and OPU2 structures, in accordance with embodiments that are described herein. In a disclosed embodiment, a CPRI option-8 signal is mapped into an ODUflex structure having a rate of about 9.872 Gbps, and therefore can be mapped into eight 1.25 Gbps tributary slots of an OPU2 structure that supports delivering data rates of about 9.995 Gbps over eight TSs. In another embodiment, a CPRI option-9 signal is mapped into an OPU2r structure resulting in an ODU2r data rate of about 11.846 Gbps.

In the table of FIG. 4, columns 15 and 16 refer to OPU OH area 60, and columns 17 . . . 3824 refer to the OPU payload area, as described, for example, in FIG. 3 above.

In the present example, the basic frame of the CPRI option-8 signal and CPRI option-9 signal comprises 320 and 384 bytes, respectively, and therefore two bytes are required for representing the offset value to the first basic frame in the payload. In FIG. 4, the bytes BFP0 and BFP1 in column 16 hold the least significant and most significant bytes of the 16-bit offset, respectively. In the example of FIG. 4, the first full basic frame has a basic frame number X=3 and therefore BaFN=0x3 in column 15. In addition, the first basic frame starts at an offset of three bytes and therefore BPF0=0x3 and BPF1=0x0. Alternatively, other basic frame numbers and/or other offsets can also be used.

Figure 5:
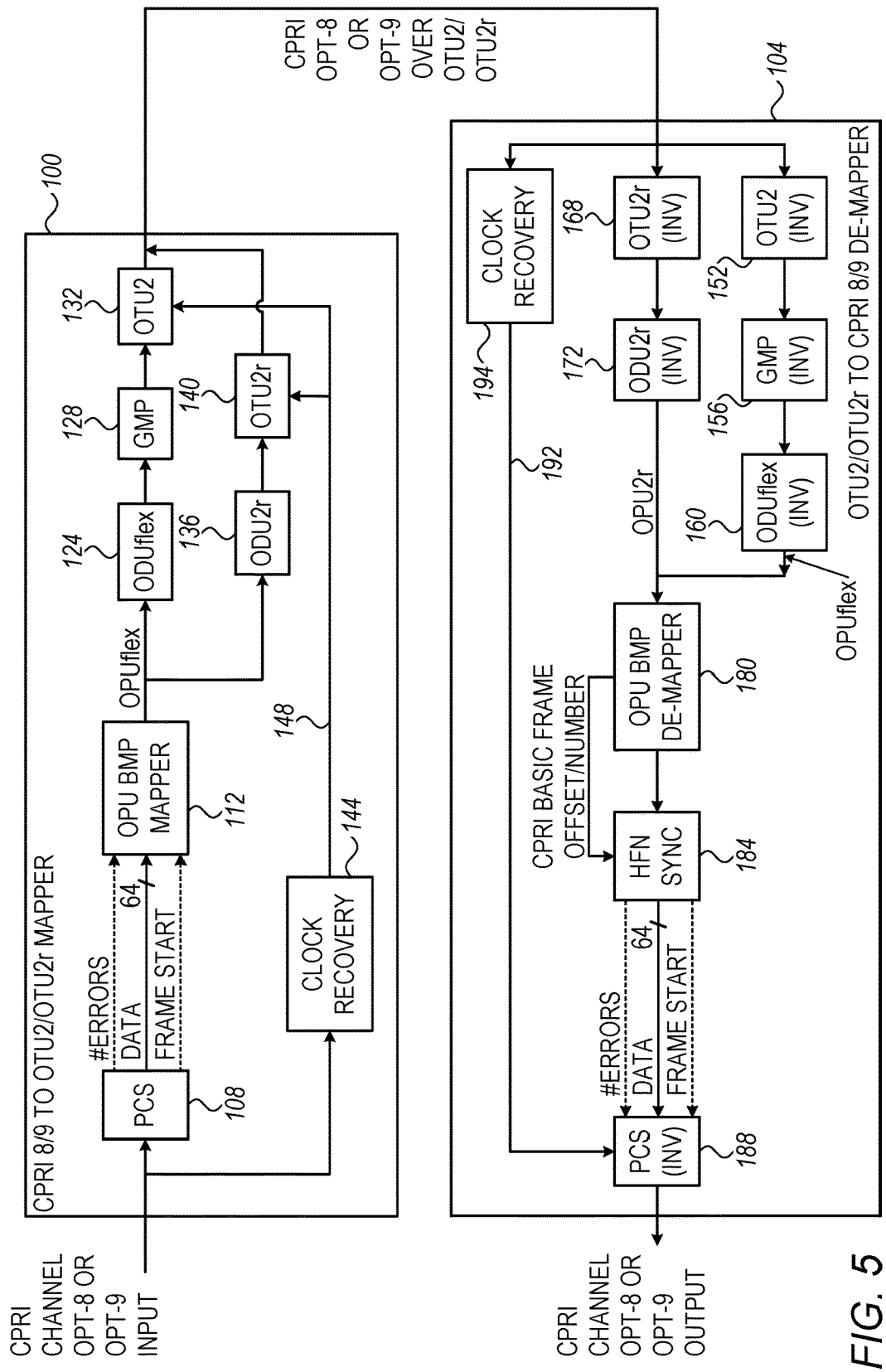
FIG. 5 is a block diagram that schematically illustrates hardware implementations of a mapper and a de-mapper for transporting CPRI option-8 signals over OTU2 and CPRI option-9 signals over OTU2r, in accordance with an embodiment that is described herein.

FIG. 5 is a block diagram that schematically illustrates hardware implementations of a mapper 100 and a de-mapper 104 for transporting CPRI OPTION-8 signals over OTU2 and CPRI OPTION-9 signals over OTU2r, in accordance with an embodiment that is described herein. The input CPRI option-8 and option-9 signals are encoded using the 64b/66b line coding scheme as specified, for example, in the IEEE standard 802.3-2008 cited above, and whose line coding formats are summarized in Table 2 above.

Mapper 100 receives a CPRI channel comprising CPRI option-8 signals or CPRI option-9 signals. Mapper 100 comprises a Physical Coding Sub-layer (PCS) module 108 for terminating the respective CPRI signals. PCS 108 recovers the 64-bit payload from the 66-bit CPRI encoded blocks in accordance with the 64b/66b line coding scheme, and delivers the eight recovered data bytes per block to OPU BMP mapper 112.

As described above, the first two 66-bit blocks indicate a hyper frame start. PCS 108 identifies the start of a CPRI hyper frame by first detecting a control block that is identified by sync bits having a value "10" as depicted in Table 2 above. PCS 108 then handles the first or last byte in the block depending on the block-type field: if the block type is 0xFF the PCS discards the first seven bytes and replaces the 0xFF bytes with a 0x00 byte, and if the block type is 0x78, the PCS discards the seven last bytes and replaces the 0x78 byte with a 0x00 byte. In an embodiment, instead of clearing the first block byte, the PCS uses this byte to carry the number of errors detected in the previous hyper frame. Alternatively, the PCS uses this byte to carry an alarm signal indicating a CPRI signal failure.

OPU BMP mapper 112 receives the CPRI data bytes from PCS 108, and maps these bytes in order into a OPUflex structure in case of a CPRI option-8 input or into a OPU2r structure in case of a CPRI option-9 input. In some embodiments, a CPRI option-8 signal is padded with stuffing bytes and mapped into an OPU2r structure, wherein the stuffing bytes can be used to carry Ethernet (or other) signals, as will be described in detail below. Mapper 112 sets the offset value corresponding to the first full basic frame in BPF0 and BPF1, and the respective basic frame number in BaFN byte as depicted in FIG. 4. The output of the OPU BMP mapper 112 is further processed in an OPUflex path or in an OPU2r path depending on whether the input is CPRI option-8 or option-9, respectively. As noted, methods for mapping CPRI option-8 signals to an OPU2r structure will be described further below.

In the OPUflex path, an ODUflex module 124 adds an ODU header to the OPUflex payload and a GMP module 128 applies a Generic Mapping Procedure (GMP) to the ODUflex structure to map the ODUflex structure into eight tributary slots of an OPU2 structure. An OTU2 module 132 then maps the OPU2 structure into an OTU2 structure by adding ODU headers and a respective transport overhead and optionally FEC symbols.

In the OPU2r path, an ODU2r module 136 adds an ODU header to the OPU2r structure to create an ODU2r structure, and an OTU2r module 140 maps this ODU2r structure into an OTU2r transport structure by adding a transport header and optionally FEC symbols.

Mapper 100 comprises a clock recovery module 144 that recovers a clock signal 148 from the CPRI option-8 or option-9 input signals for transmitting the OTU2 and OTU2r structures in synchronization with the CPRI input signals.

De-mapper 104 receives OTU2 or OTU2r frames in which CPRI signals are mapped in accordance with the mapping schemes of mapper 100 as described above, and performs inverse processing with respect to mapper 100.

In the OPUflex path, OTU2 (inverse) module 152 may perform error correction using the FEC symbols in the OTU2 structure (when the FEC symbols are available), and recovers the OPU2 structure, to which the GMP (inverse) module 156 applies inverse GMP mapping to recover the ODUflex structure. ODUflex (inverse) module 160 then extracts the OPUflex payload from the ODUflex structure.

In the OPU2r path, OTU2r (inverse) module 168 may perform error correction using the FEC symbols in the OTU2r structure (when the FEC symbols are available), and recovers the ODU2r structure, from which an ODU2r (inverse) module 172 extracts the OPU2r payload.

An OPU BMP de-mapper 180 receives the OPUflex structure or OPU2r structure, synchronizes to the CPRI basic frames using the BFP0 and BFP1 bytes values in column 16 of the OPU overhead, and recovers the respective basic frame number from the BaFN byte in column 1. A HFN synchronizer 184 synchronizes on the CPRI hyper frames, and delivers 64-bit blocks to PCS (inverse) 188. In some embodiments, HFN synchronizer 184 uses byte Z.64.0 in the $64^{th}$ basic frame, which holds the Hyper Frame Number (HFN), for hyper frame synchronization.

In some embodiments, HFN synchronizer 184 examines byte Z.X.0 in a sub-sequence (or multiple sub-sequences) of CPRI basic frames that are a hyper frame interval apart from one another, to find a sub-sequence of basic frames in which the Z.X.0 values (i.e., for X=64 this value holds the HFN) form a monotonic and cyclical integer count in the range 0 . . . 149. HFN synchronizer 184 then identifies the first byte of the hyper frame based on the position of the Z.64.0 byte.

In alternative embodiments, HFN synchronizer 184 can use any other suitable synchronization method, such as, for example methods that are based on fields within the CPRI basic frames that hold predefined values.

Similar methods to those described above for basic frame and hyper frame synchronization are described, for example, in U.S. Application Publication 2015/0180575, which is assigned to the assignee of the present patent application and whose disclosure is incorporated herein by reference.

As described above, HFN synchronizer 184 provides the CPRI data bytes to PCS (inverse) 188. In some embodiments, HFN synchronizer 184 extracts the number of errors detected in the previous hyper frame from byte Z.0.0 (or an alarm signal) and passes the number of errors (or the alarm signal) to PCS (inverse) 188. PCS (inverse) 188 encodes 64-bit blocks into 66-bit encoded blocks in accordance with the 64b/66b line coding scheme, generates the two 66-bit control blocks indicating the hyper frame start. In an embodiment, when the number of error reported is non-zero or the alarm signal indicates a failure in the CPRI signal, PCS (inverse) 188 discards the relevant CPRI bytes, and issues a fault indication instead.

PCS (inverse) 188 transmits the CPRI signal using a clock signal 192 that is recovered from the OTU2 or OTU2r frames received in de-mapper 104 using a clock recovery module 194.

As described above, mapper 100 comprises a clock recovery module for producing from the received CPRI channels (e.g., from a BBU) a clock signal for transmitting the OTU2 or OTU2r frames over the OTN, and de-mapper 100 comprises a clock recovery module for producing from the OTU2 or OTUt2 frames received from the network a clock signal for sending the recovered CPRI signals to a target destination (e.g., RRH). Clock recovery mechanism of this sort is described, for example, in U.S. Application Publication 2015/0180575, cited above.

Figure 7:
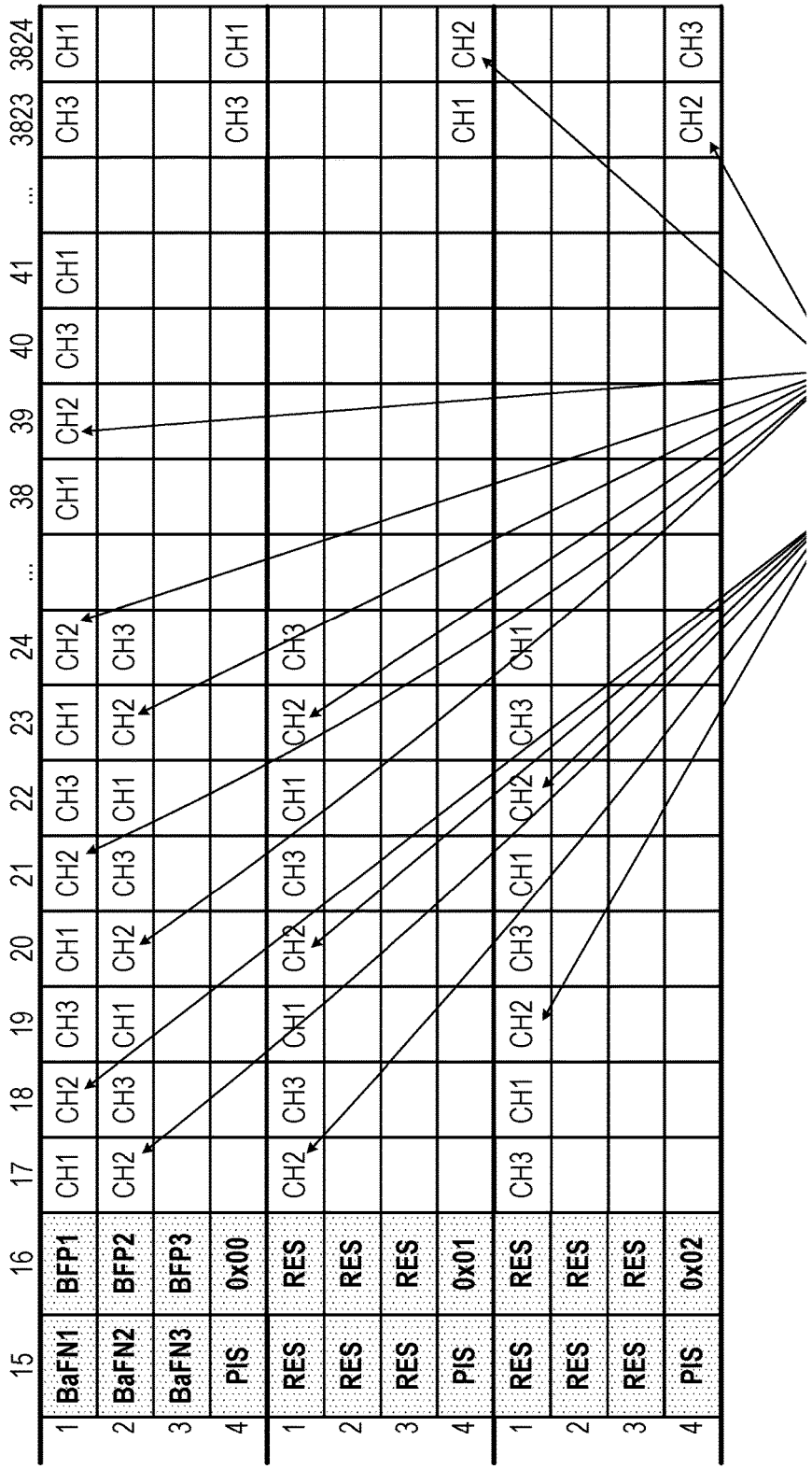

Multiplexing CPRI Option-3/4/5 Signals and Ethernet Signals for Delivery Over OTN FIGS. 6 and 7 are diagrams depicting tables for mapping CPRI option-3/4/5 channels plus Ethernet signals into an OPU2r structure, in accordance with embodiments that are described herein. The table of FIG. 6 maps six CPRI option-3 channels plus Ethernet signals into OPU2r structures, whereas the table of FIG. 7 maps three CPRI option-4 channels plus Ethernet signals or three CPRI option-5 channels plus Ethernet signals into the OPU2r structures.

In the table of FIG. 6, six CPRI option-3 channels denoted CH1 . . . CH6 are byte-interleaved over a multi-frame structure that comprises three OPU2r structures in which the OMFI bytes get respective values 0x00, 0x01 and 0x02. Interleaving the channels is carried out by taking one byte from each channel in order. For example, the OPU2r structure whose OMFI=0x00 starts at column 17 with byte ordering CH1 . . . CH6, CH1 . . . CH6, and so on. The basic frame pointer BFPi and the respective basic frame number BaFNi of the CPRI channels CH1 . . . CH3 and for the CPRI channels CH4 . . . CH6 are carried in columns 16 and 15 of the payload structures having OMFI values 0x00 and 0x01, respectively.

In a disclosed embodiment, Ethernet signals are mapped to CPRI channels that are not in use. In the example of FIG. 6, CPRI channel CH5 is unused, and therefore Ethernet bytes can be carried over the bytes of this channel.

In the table of FIG. 7, three CPRI option-4 channels or three CPRI option-5 channels denoted CH1 . . . CH3 are byte-interleaved over a multi-frame structure that comprises three OPUr2 structures. The CPRI option-4 signal is padded (before being mapped) by inserting three stuffing bytes following each sequence of five data bytes, so as to match the rate of the CPRI option-5 signal. The padded CPRI option-4 signal or the CPRI option-5 signal is byte-interleaved in accordance with the channels order, i.e., CH1, CH2, CH3, CH1, . . . and so on. The basic frame pointers BFP1 . . . BFP3 and the respective basic frame numbers BaFN1 . . . BaFN3 are set in the respective columns 16 and 15 of the payload structure in which OMFI=0x00. In general, Ethernet bytes can be carried out over unused CPRI option-5 or option-4 channels, or over stuffing bytes in case of CPRI option-4 signals. In the example of FIG. 7, Ethernet signals are carried over unused bytes of CH2, which is a CPRI option-5 channel. The table of FIG. 7 can be used for mapping both CPRI option-4 and CPRI option-5 signals to the same OPU2r multi-frame structure.

Figure 8A:
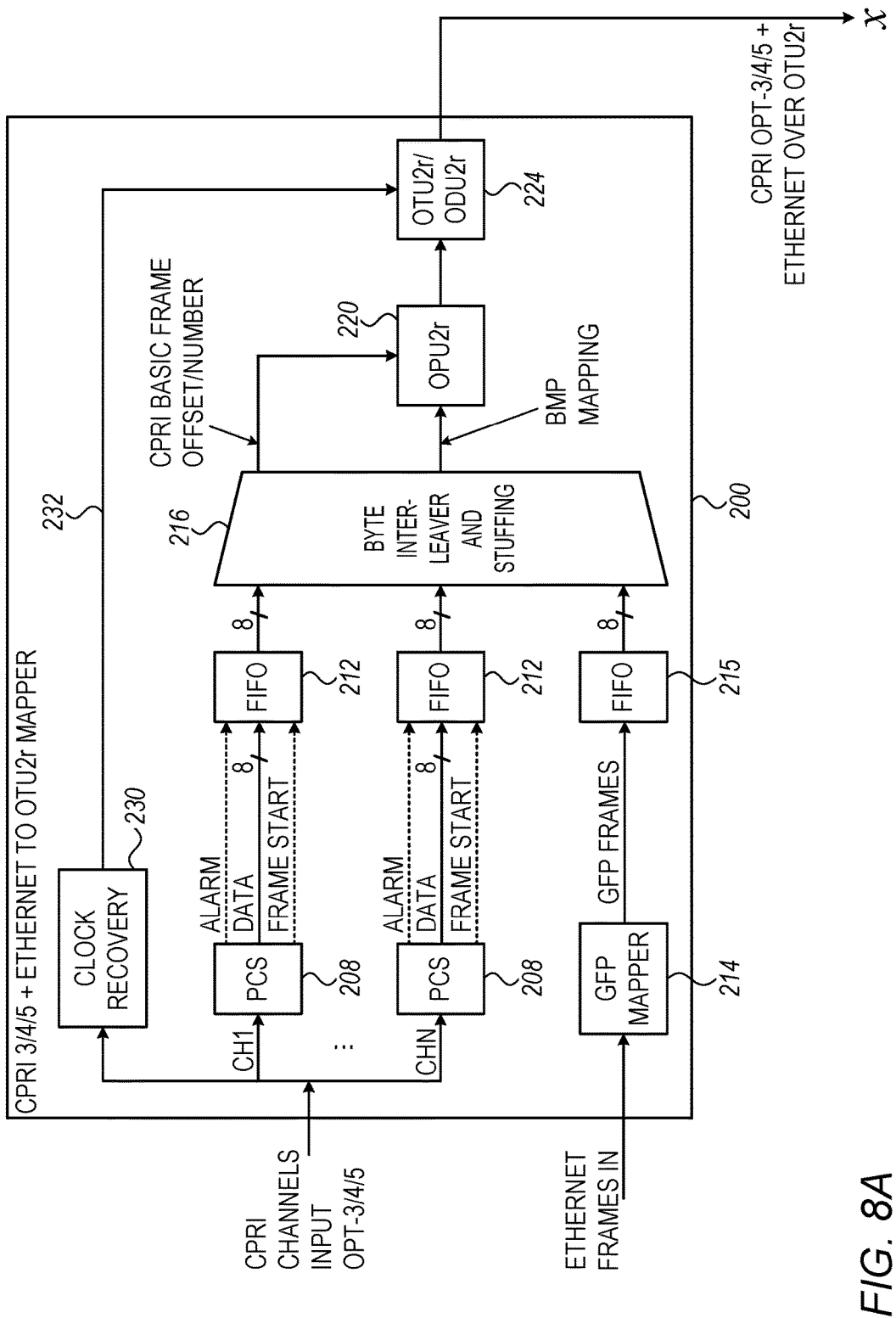
FIGS. 8A and 8B are block diagrams that schematically illustrate respective hardware implementations of a mapper and a de-mapper for transporting CPRI option-3/4/5 signals plus Ethernet signals over OTU2r, in accordance with embodiments that are described herein.
Figure 8B:
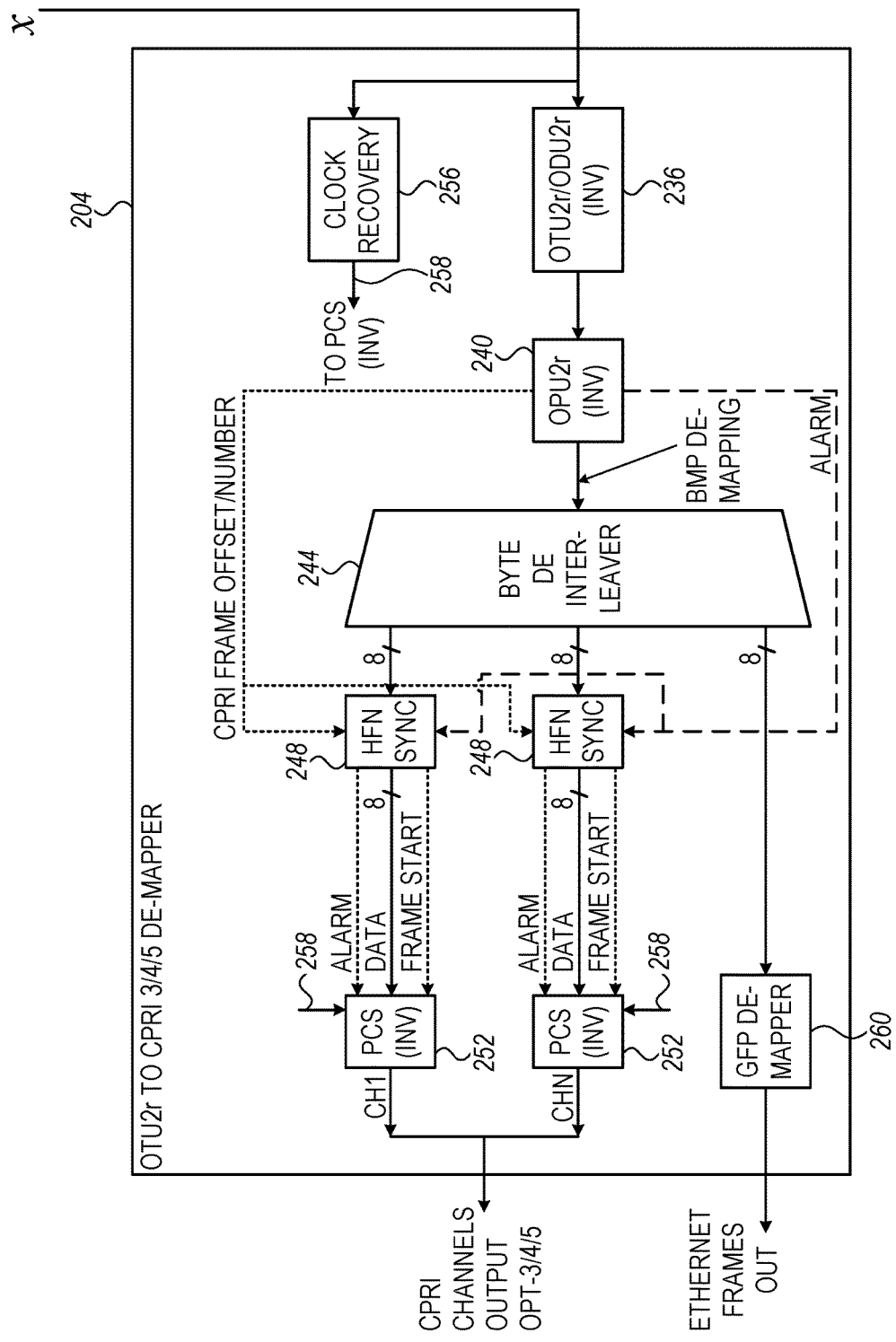

FIGS. 8A and 8B are block diagrams that schematically illustrate respective hardware implementations of a mapper 200 and a de-mapper 204 for transporting CPRI option-3/4/5 signals plus Ethernet signals over OTU2r, in accordance with embodiments that are described herein. In accordance with the CPRI V6.1 specifications, the CPRI option-3/4/5 signals are encoded using the 8b/10b line encoding scheme, and the byte Z.0.0 is encoded as the K28.5 control symbol that uses for synchronization.

Mapper 200 of FIG. 8A receives up to N CPRI signals denoted CH1 . . . CHN, wherein the maximal number of CPRI channels N depends on the CPRI rate option used. In the present example, for CPRI option-3, N=6, and for CPRI option-4 and CPRI option-5 N=3. Mapper 200 comprises N PCS units 208 for terminating the respective CPRI signals. PCS 208 recovers the CPRI data bytes from the 10-bit CPRI data symbols in accordance with the 8b/10b line coding scheme, and stores the recovered CPRI bytes in a respective FIFO 212.

FIFO 212 typically comprises a few bytes of storage, such as, for example a two-byte FIFO. Alternatively, FIFO 212 may comprise any other suitable storage capacity. Further alternatively, storage elements other than a FIFO and of any suitable storage capacity can also be used.

PCS 208 identifies the start of CPRI hyper frames by detecting the synchronization symbol K28.5 among the CPRI symbols. PCS 208 discards the K28.5 synchronization symbol, and sets the respective byte Z.0.0 to 0x00, to the number of errors detected by PCS 208, or to an alarm indication in case that PCS 208 detects a major CPRI signal failure.

Mapper 200 additionally receives Ethernet frames, and encapsulates the Ethernet frames using a Generic Framing Procedure (GFP) mapper 214. GFP mapper 214 applies a frame-mapped GFP encapsulation (also referred to as GFP-F), or a transparent GFP encapsulation (also referred to as GFP-T), in accordance with the ITU-T Recommendation G.7041, which is described, for example, in "ITU-T G.7041/Y.1303, Generic framing procedure, Series G: Transmission systems and media, digital systems and networks, Data over Transport—Generic aspects—General, Series Y: Global information infrastructure, internet protocol aspects and next-generation networks, Internet protocol aspects—Transport," April, 2011, whose disclosure is incorporated herein by reference.

GFP mapper 214 adapts to a rate higher than the data rate in the GFP frames by adding idle GFP frames that carry no data. GFP mapper 214 outputs GFP frames that are temporarily stored in a FIFO 215.

A byte interleaver 216 receives the CPRI data bytes from FIFOs 212 and the Ethernet bytes (carried in GFP frames) from FIFO 215. For CPRI option-3 and CPRI option-inputs, interleaver 216 interleaves the CPRI channels and the Ethernet signals by orderly outputting one byte from each CPRI channel that carries data, and Ethernet bytes in place of CPRI channels that are not used for carrying data, and repeating this order as necessary.

For the CPRI option-4 input, interleaver 216 pads the CPRI signal with three stuffing bytes for every five data bytes. In some embodiments, the interleaver inserts Ethernet bytes in place of the stuffing bytes. Then the interleaver interleaves three CPRI option-4 signals that carry Ethernet bytes over the stuffing bytes. The data rate available in the option-4 stuffing bytes is 3.84·128·3=1474.56 Mbps, and therefore a Gigabit Ethernet (GBE) signal or a lower rate signal can be transported over the stuffing bytes.

In some embodiments, two or more CPRI channels of rate option-3 or option-5 are unused for carrying data. In such embodiments, the interleaver can transport multiple low-rate Ethernet signals over multiple respective unused time slots of the payload structure, or transport a high-rate Ethernet signal over multiple concatenated unused time slots. Similarly, the stuffing bytes of two or more CPRI option-4 channels can be concatenated to achieve a higher rate, or to transport multiple respective independent low-rate Ethernet signals.

In some embodiments, the interleaver supports a GFP linear extension mode of operation, as specified, for example in the ITU-T Recommendation G.7041 cited above. In these embodiments, the interleaver can map multiple Ethernet signals to a single unused time slot of the payload structure, or to multiple concatenated unused time slots. Similarly, using the GFP linear extension mode, the interleaver can map multiple Ethernet signals to the stuffing bytes of multiple respective CPRI option-4 signals, or to concatenated stuffing bytes of multiple CPRI option-4 channels.

Interleaver 216 also handles rate control for the Ethernet signals. When the data rate of the GFP frames to be mapped is higher than the rate available by the unused time slots or stuffing bytes allocated to these GFP frames, the interleaver limits the rate in which GFP-F frames are mapped using any suitable traffic management method, and limits the rate in which GFP-T frames are mapped by removing Inter-Frame Gap (IFG) characters.

Interleaver 216 outputs a byte sequence in which CPRI channels and Ethernet signals are multiplexed towards an OPU2r module 220, which maps the multiplexed CPRI and Ethernet bytes in one or more OPU2r structures (of on OTN multi-frame) using a BMP. In some embodiments, OPU2r module 220 maps the CPRI and Ethernet signals in accordance with the table of FIG. 6 for a CPRI option-3 input, or the table of FIG. 7 for a CPRI option-4 or option-5 input.

Interleaver 216 indicates to OPU2r unit 220 an offset value, offset (N), corresponding to the first CPRI basic frame for the $N^{th}$ CPRI signal, and OPU2r module 220 uses the offset (N) value to set the respective BFPn pointer. In an example embodiment, OPU2r module 220 sets the BFPn value to the number of bytes mapped to the OPU2r payload before the beginning of a CPRI basic frame. Alternatively, OPU2r module 220 may calculate the BFPn value using any other suitable method. In addition, interleaver 216 sets for the basic frame pointed to by BFPn, a respective BaFN value indicating its basic frame number within the hyper frame in column 15 of the payload header.

An ODU2r/OTU2r module 224 generates communication frames suitable for delivery over the optical network in accordance with ITU-T Recommendation G.709/Y.1331 cited above. Module 224 adds an ODU overhead to the OPU2r structure to derive an ODU2r structure, and optionally adds FEC symbols (or bits), as well as an OTU overhead and a FA OH, to produce an OTU2r structure.

Mapper 200 comprises a clock recovery module 230 that recovers a clock signal 232 synchronized to the clock of the CPRI signals received. Mapper 200 transmits the OTU2r (or ODU2r) frames using the recovered clock signal 232.

De-mapper 204 of FIG. 8B receives OTU2r (or ODU2r) frames in which CPRI signals and Ethernet signals are mapped in accordance with the mapping schemes of mapper 200 as described above, and performs inverse processing with respect to mapper 200. When receiving OTU2r frames, OTU2r/ODU2r (inverse) module 236 may perform error correction using the FEC symbols (or bits) in the OTU2r structure (when FEC information is available), and extracts from the resulting ODU2r structure the OPU2r payload. Alternatively, de-mapper 204 receives ODU2r frames, and module 236 skips the error correction processing.

An OPU2r (inverse) module 240 performs inverse BMP to extract the CPRI data bytes from the payload area of the OPU2 structure. In an embodiment, OPU2r (inverse) module 240 de-maps the CPRI data bytes in the OPU2r payload using one of the mapping tables of FIGS. 6 and 7 above. Module 240 delivers the CPRI data bytes to a byte de-interleaver 244, which separates between the bytes of the different CPRI channels and the Ethernet signals.

OPU2r (inverse) module 240 additionally synchronizes to the CPRI basic frames using the BFPn and OMFI values in OPU2r OH 60. In addition, OPU2r extracts the basic frame number from byte BaFNn (indicating the basic frame number within the hyper frame) corresponding to pointer BPFn.

Byte de-interleaver 244 delivers the de-interleaved bytes of each the CPRI channels separately to a respective HFN synchronizer 248, which synchronizes on the CPRI hyper frames. In some embodiments, HFN synchronizer 248 uses byte Z.64.0 in the $64^{th}$ basic frame, which holds the Hyper Frame Number (HFN), for hyper frame synchronization, as described above.

HFN synchronizer 248 provides the CPRI data bytes to a respective PCS (inverse) module 252. When the alarm signal carried in the first byte of the hyper frame is zeroed, i.e., Z.0.0=0x00, PCS (inverse) 252 encodes the CPRI data bytes into 10-bit CPRI symbols in accordance with the 8b/10b line coding scheme, and replaces the Z.0.0 bytes with the K28.5 synchronization symbol. When Z.0.0 indicates an alarm, when the OTN server layer detects an alarm indication, or when Z.0.0 carries the number of errors detected in a previous hyper frame and this number of errors in nonzero, PCS (inverse) 252 discards the CPRI bytes and outputs a fault indication instead. The PCS (inverse) may also recover the number of errors detected by PCS 208 from the Z.0.0 replacement byte.

A clock recovery module 256 recovers a clock signal 258 from the received OTU2r or ODU2r frames, which PCSs (inverse) 252 use for transmitting the CPRI signals.

A GFP de-mapper 260 receives the Ethernet signals (carried in GFP frames) extracted from the OPU2r structure by de-interleaver 244, and applies inverse GFP-F or GFP-T mapping to the GFP frames to recover the Ethernet frames. De-mapper 204 then transmits the recovered Ethernet frames.

In the hardware implementations described above, the OTU2r signal rate is given by $3.84 \cdot 512 \cdot 6 \cdot 255/238 \approx 12.64$ Gbit/sec, wherein 3.84 Mhz refers to the frame rate of the CPRI basic frame. In alternative embodiments, the OTN frames are delivered without the FEC bits, i.e., and the ODU2r rate equals $3.84 \cdot 512 \cdot 6 \cdot 239/238 \approx 11.84$ Gbit/sec.

Coordinating the actual multiplexing scheme used between mapper 200 and de-mapper 204, e.g., the number of unused CPRI channels, the GFP mapping being used and so on, can be carried out in various ways. In some embodiments, the multiplexing scheme being used is preconfigured in both mapper 200 and de-mapper 204. In other embodiments, the multiplexing scheme is communicated via an available field in the payload overhead structure. For example, a byte indicated by RES in the mapping tables can be used for this purpose. Alternatively, the PSI byte can be used, similarly to using a Multiplex Structure Identifier (MSI) as described, for example, in the ITU-T Recommendation G.709/Y.1331 cited above.

Figures 9, 10:
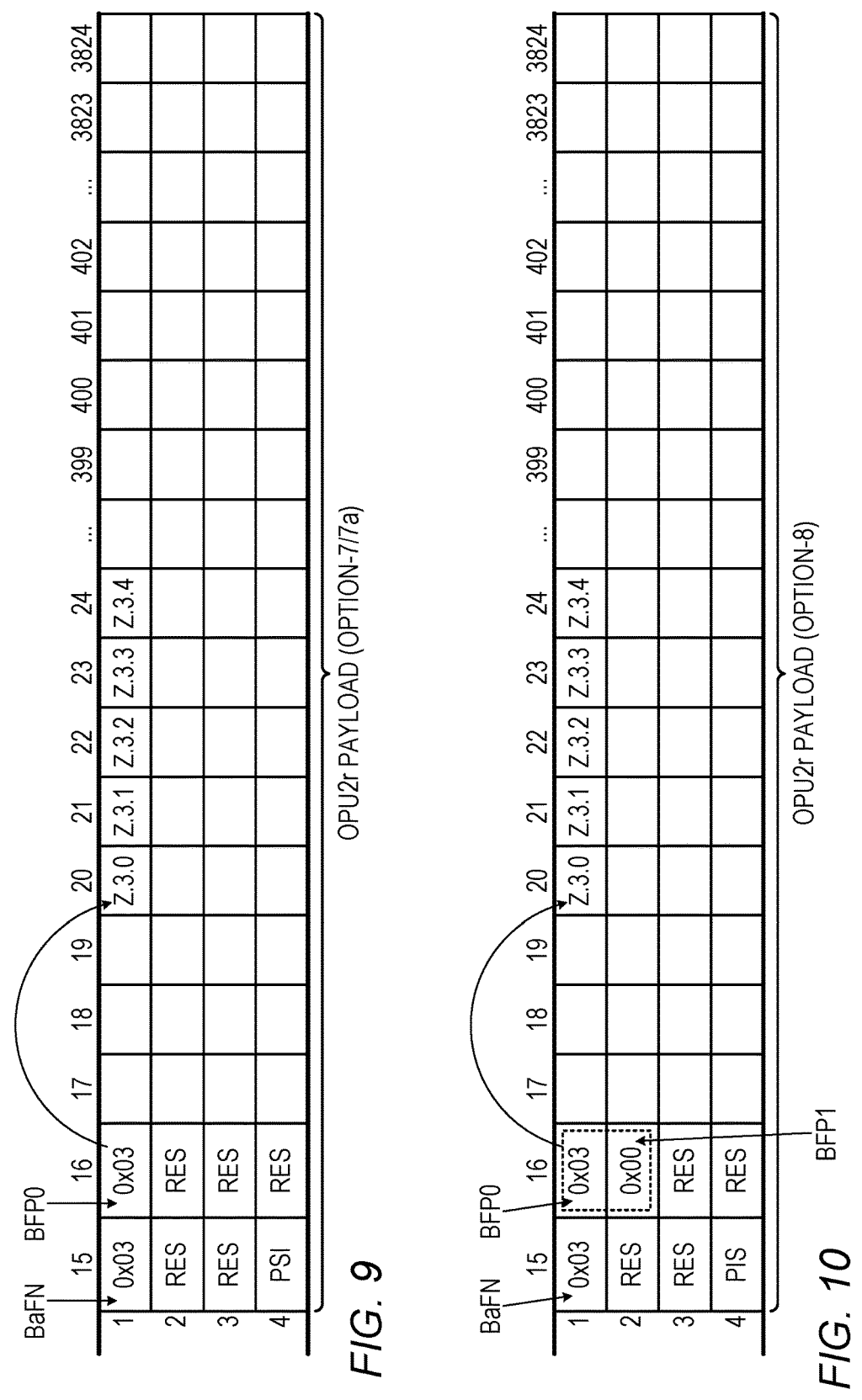

Multiplexing CPRI Option-7/7A/8 Signals and ETHERNET Signals for Delivery Over OTN FIGS. 9 and 10 are diagrams depicting tables for mapping CPRI option-7/7a/8 channels plus Ethernet signals into an OPU2r structure, in accordance with embodiments that are described herein. The table of FIG. 9 can be used for mapping a CPRI option-7 signal plus Ethernet signals into an OPU2r structure, or for mapping a CPRI option-7a signal plus Ethernet signals into an OPU2r structure.

Since the basic frame of CPRI option-7 and option-7a signals comprises 256 bytes, a single byte BFP0 is sufficient for representing the byte-offset to the first basic frame in the payload structure. A CPRI option-7 signal and a CPRI option-7a signal are mapped into the OPU2r payload after adding eight stuffing bytes for each sequence of sixteen data bytes. In some disclosed embodiments, these stuffing bytes are used for carrying the Ethernet signals.

The table of FIG. 10 can be used for mapping a CPRI option-8 signal and Ethernet signals into an OPU2r structure. Since the basic frame in a CPRI option-8 signal comprises 320 bytes, the offset to the first basic frame in the payload structure is represented by a 16-bit value in bytes BFP0 and BFP1. A CPRI option-8 signal is mapped to the payload structure after adding four stuffing bytes for each sequence of twenty data bytes. In some embodiments, these stuffing bytes can be used for carrying Ethernet signals.

Figure 11:
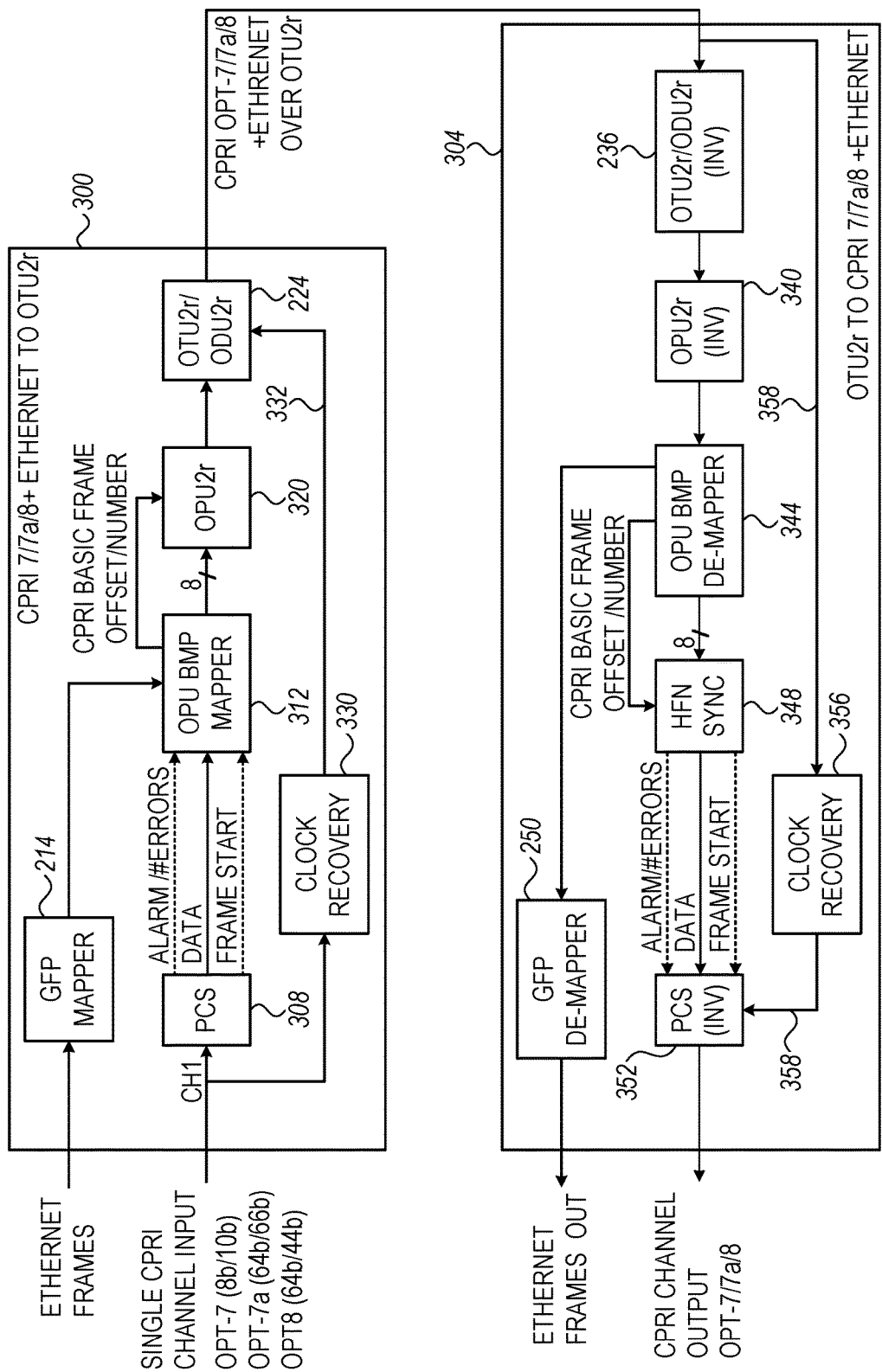
FIG. 11 is a block diagram that schematically illustrates hardware implementations of a mapper and a de-mapper for transporting CPRI options-7/7a/8 signals and Ethernet signals over OTN, in accordance with an embodiment that is described herein.

FIG. 11 is a block diagram that schematically illustrates hardware implementations of a mapper 300 and a de-mapper 304 for transporting CPRI options-7/7a/8 signals and Ethernet signals over OTN, in accordance with an embodiment that is described herein. The input CPRI option-7 signals are encoded using the 8b/10b line encoding scheme, and the byte Z.0.0 is encoded as the K28.5 control symbol that uses for synchronization. The input CPRI option-7a and CPRI option-8 signals are encoded using the 64b/66b line encoding scheme, and the bytes Z.0.0 . . . Z.0.15 are used for synchronization.

Mapper 300 receives a CPRI signal whose rate option can be: option-7, option-7a or option-8. Mapper 300 comprises a PCS module 308 for terminating the respective CPRI signals. For CPRI option-7 input, PCS 308 recovers the CPRI data bytes from the 10-bit CPRI data symbols in accordance with the 8b/10b line coding scheme, similarly to PCS 208 described above. For CPRI option-7 and option-inputs, PCS 308 recovers data blocks of eight CPRI bytes from the 66-bit encoded blocks, similarly to PCS 108 described above. The CPRI bytes recovered by PCS 308 are delivered to an OPU BMP mapper 312.

For CPRI option-7, PCS 308 identifies the start of CPRI hyper frames by detecting the synchronization symbol K28.5 among the CPRI symbols. PCS 308 discards the K28.5 synchronization symbol, and sets the respective byte Z.0.0 to 0x00, to the number of errors detected by PCS block 308 or to an alarm indication in case PCS block 308 detects a CPRI signal failure.

For CPRI option-7a and option-8, PCS 308 synchronizes on the hyper frames using the two 66-bit control blocks, and sets Z.0.0 to zero, to the number of error detected by PCS 308 in the previous hyper frame, or to an alarm indication, as described above.

Mapper 300 additionally comprises GFP mapper 214, which receives Ethernet frames, encapsulates the Ethernet frames in GFP frames, and manages rate control for the Ethernet signals, as described above.

OPU BMP mapper 312 receives the CPRI data bytes from PCS 308, and Ethernet bytes (carried in GFP frames) from GFP mapper 214. Module 312 adds to the CPRI signal stuffing bytes in accordance with the respective CPRI rate option, and replaces the stuffing bytes with Ethernet bytes of the GFP frames. For CPRI option-7a and option-8, the stuffing bytes can carry Ethernet signals of up to 3932.16 Kbps and 1966.08 Kbps, respectively.

Module 312 outputs a byte sequence that multiplexes the CPRI channel and the Ethernet signals towards an OPU2r module 320, which maps the multiplexed CPRI and Ethernet bytes in a OPU2r structure using a BMP. In some embodiments, OPU2r module 220 maps the CPRI and Ethernet signals in accordance with one of the mapping tables of FIGS. 9 and 10 above, depending on the underlying CPRI rate option. Module 312 indicates to OPU2r module 320 an offset value, corresponding to the first CPRI basic frame for the in the payload structure, and OPU2r module 320 sets this offset value in BFP0 (CPRI option-7/7a) or BFP0+BFP1 (CPRI option-8.) Additionally, OPU2r 320 sets in the first byte of the payload header (BaFN) the basic frame number corresponding to the basic frame pointed to by BFP0 or BFP0+BFP1.

OTU2r/ODU2r module 224 generates communication frames suitable for delivery over the optical network in accordance with ITU-T Recommendation G.709/Y.1331, by adding required headers and FEC bits, as described above.

In some embodiments, mapper 300 supports outputting either OTU2r frames that include the FEC bits, or ODU2r frames excluding the FEC bits.

Mapper 300 comprises a clock recovery module 330, which recovers a clock signal 332 that is synchronized to the clock of the CPRI signals received. Mapper 300 transmits the OTU2r (or ODU2r) frames to the OTN network using the recovered clock signal 332.

De-mapper 304 receives from the OTN network OTU2r (or ODU2) frames in which CPRI option-7/7a/8 signals and Ethernet signals are mapped in accordance with the mapping schemes of mapper 300 as described above, and performs inverse processing with respect to mapper 300. OTU2r/ODU2r (inverse) module 236 may perform error correction using the FEC symbol (or bits) in the OTU2r structure, and extracts from the resulting ODU2r structure the OPU2r payload. An OPU2r (inverse) unit 340 extracts from the payload area of the OPU2 structure the CPRI bytes and the Ethernet bytes and delivers these bytes to an OPU BMP de-mapper 344, which separates between the CPRI data bytes and the Ethernet bytes carried in GFP frames over the stuffing bytes. In an embodiment, module 344 de-maps the CPRI data bytes in the OPU2r payload using one of the mapping tables of FIGS. 9 and 10 above. Module 344 synchronizes to the CPRI basic frames using the BFPn and OMFI values in OPU2r OH 60. In addition, module 344 extracts the basic frame number BaFN of the first full basic frame in the payload structure.

Module 344 delivers the extracted CPRI bytes to a HFN synchronizer 348, which synchronizes on the CPRI hyper frames. In some embodiments, HFN synchronizer 348 operates similarly to HFN synchronizer 248 described above, and uses byte Z.64.0 in the 64$^{th}$ basic frame for hyper frame synchronization.

HFN synchronizer 348 provides the CPRI data bytes to a respective PCS (inverse) unit 352, which encodes the CPRI bytes in a CPRI channel in accordance with the underlying rate option. For CPRI option-7, PCS (inverse) 252 applies the 8b/10b encoding scheme, and for CPRI option-7a and option-8, PCS (inverse) 252 applies the 64b/66b encoding scheme, as described above. When the alarm signal in Z.0.0 indicates a CPRI signal failure or when Z.0.0 carries the number of errors detected in a previous hyper frame and this number of errors in non-zero, PCS (inverse) 352 discards the relevant CPRI bytes and issues a fault indication instead.

A clock recovery module 356 recovers a clock signal 358 from the received OTU2r (or ODU2r) frames, which PCS (inverse) 352 uses for transmitting the CPRI signals.

GFP de-mapper 250 receives the GFP frames extracted from the OPU2r structure by OPU BMP de-mapper 344, and applies GFP-F or GFP-T inverse mapping to recover and send the Ethernet frames, as described above.

In the hardware implementations described above, the OTU2r signal rate is about 12.64 Gbit/sec, and the ODU2r rate is about 11.84 Gbit/sec, similarly to the rates described above with reference to FIG. 8.

The embodiments described above are given by way of example, and other suitable embodiments can also be used. For example, although in some of the described embodiments CPRI channels are multiplexed with Ethernet signals for delivery over OTN, in alternative embodiments, the CPRI channels can be multiplexed with other suitable signals that meet similar data rate constraints as the Ethernet signals.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
    receiving in a first communication interface input frames, which comprise data symbols that were derived by encoding respective characters, and further comprise one or more synchronization symbols distinguishable from the data symbols;
    recovering the characters from the data symbols, and
    mapping the characters into Optical Transport Network (OTN) communication frames and discarding the synchronization symbols, wherein the mapping is performed using a Bit-synchronous Mapping Procedure (BMP), while filling some locations in the OTN frames with stuffing characters, so that the rate of the first characters matches a desired rate of the OTN communication frames, wherein a protocol for delivering the characters in the OTN communication frames supports a mapping scheme in which the characters are delivered at a first data rate, and wherein mapping the characters comprises mapping the characters so as to deliver the characters at a second data rate that is lower than the first data rate;
    transmitting the OTN communication frames carrying the mapped characters to a second communication interface;
    extracting the characters from the communication frames in the second communication interface by synchronizing to the mapped input frames independently of the synchronization symbols; and
    reconstructing the input frames in the second communication interface to produce reconstructed input frames, including the data symbols and the synchronization symbols, by re-encoding the extracted characters.

2. The method according to claim 1, wherein the data symbols are carried in Common Public Radio Interface (CPRI) signals and are derived from eight-bit characters using a 64-bit to 66-bit (64b/66b) encoding protocol, and wherein transmitting the recovered characters comprises transmitting the communication frames, with the recovered characters mapped therein, over an optical communication network.

3. The method according to claim 1, wherein mapping the characters comprises mapping the input frames to payload areas of the communication frames, and setting in overhead fields of the communication frames pointers to at least some of the mapped input frames.

4. The method according to claim 3, wherein synchronizing to the mapped input frames comprises identifying respective positions of the input frames within the payload areas of the communication frames using the pointers.

5. The method according to claim 1, wherein receiving the input frames comprises receiving hyper frames that each comprises multiple input frames, wherein discarding the synchronization symbols comprises setting in place of the synchronization symbols an alarm signal that indicates a failure in the input frames, or a number of errors detected in a previous hyper frame, and wherein reconstructing the input frames comprises reconstructing the input frames, including regenerating the synchronization symbols, when the alarm signal indicates no failures in the input frames or when the number of errors detected is zero, and outputting a fault indication otherwise.

6. The method according to claim 1, and comprising deriving from the input frames received in the first communication interface a first clock signal, and further deriving from the communication frames received in the second communication a second clock signal, wherein transmitting the communication frames comprises outputting the communication frames from the first communication interface using the first clock, and wherein reconstructing the input frames in the second communication interface comprises sending the reconstructed input frames using the second clock.

7. An apparatus for communication, comprising:
    a first communication interface, which is configured to:
        receive input frames, which comprise data symbols that were derived by encoding respective characters, and further comprise one or more synchronization symbols distinguishable from the data symbols,
        recover the characters from the data symbols,
        map the characters into Optical Transport Network (OTN) communication frames and discard the synchronization symbols, and transmit the OTN communication frames carrying the mapped characters, wherein the mapping is performed using a Bit-synchronous Mapping Procedure (BMP), while filling some locations in the OTN frames with stuffing characters, so that the rate of the first characters matches a desired rate of the OTN communication frames, wherein a protocol for delivering the characters in the OTN communication frames supports a mapping scheme in which the characters are delivered at a first data rate, and wherein the first communication interface is configured to map the characters so as to deliver the characters at a second data rate that is lower than the first data rate; and
    a second communication interface, which is configured to:
        receive the communication frames from the first communication interface, extract the characters from the communication frames by synchronizing to the mapped input frames independently of the synchronization symbols, and
        reconstruct the input frames to produce reconstructed input frames, including the data symbols and the synchronization symbols, by re-encoding the extracted characters.

8. The apparatus according to claim 7, wherein the data symbols are carried in Common Public Radio Interface (CPRI) signals and are derived from eight-bit characters using a 64-bit to 66-bit (64b/66b) encoding protocol, and wherein the first communication interface is configured to transmit the communication frames, with the recovered characters mapped therein, over an optical communication network.

9. The apparatus according to claim 7, wherein the first communication interface is configured to map the input frames to payload areas of the communication frames, and to set in overhead fields of the communication frames pointers to at least some of the mapped input frames.

10. The apparatus according to claim 9, wherein the second communication interface is configured to synchronize to the mapped input frames by identifying respective positions of the input frames within the payload areas of the communication frames using the pointers.

11. The apparatus according to claim 7, wherein the first communication interface is configured to receive the input frames by receiving hyper frames that each comprises multiple input frames, and to discard the synchronization symbols by setting in place of the synchronization symbols an alarm signal that indicates a failure in the input frames, or a number of errors detected in a previous hyper frame, and wherein the second communication interface is configured to reconstruct the input frames, including regenerating the synchronization symbols, when the alarm signal indicates failures in the input frames or when the number of errors detected is non-zero, and to output a fault indication otherwise.

12. The apparatus according to claim 7, wherein the first communication interface is configured to derive from the received input frames a first clock signal, and to transmit the communication frames using the first clock, and wherein the second communication interface is configured to derive from the communication frames a second clock signal, and to send the reconstructed input frames using the second clock.

13. A method for communication, comprising:
receiving in a first communication interface input frames, which comprise data symbols that were derived by encoding respective first characters, and further comprise one or more synchronization symbols distinguishable from the data symbols;
receiving in the first communication interface Ethernet frames that encapsulate second characters;
recovering the first characters from the data symbols and recovering the second characters from the Ethernet frames;
mapping the first characters into Optical Transport Network (OTN) communication frames and discarding the synchronization symbols, wherein the mapping is performed using a Bit-synchronous Mapping Procedure (BMP), while leaving locations in the OTN frames empty from carrying first characters, so that the rate of the first characters matches a desired rate of the OTN communication frames;
mapping the second characters into at least some of the locations in the OTN communication frames that carry no first characters;
transmitting the OTN communication frames carrying the mapped first characters and the mapped second characters, to a second communication interface;
extracting the first and second characters from the communication frames in the second communication interface by synchronizing to the input frames independently of the synchronization symbols; and
reconstructing the input frames in the second communication interface, including the data symbols and the synchronization symbols, by re-encoding the extracted first characters, and further reconstructing in the second communication interface the Ethernet frames by re-encapsulating the extracted second characters into the Ethernet frames.

14. The method according to claim 13, wherein the data symbols are carried in Common Public Radio Interface (CPRI) signals and are derived from eight-bit characters using an eight-bit to ten-bit (8b/10b) encoding protocol or using a 64-bit to 66-bit (64b/66b) encoding protocol, depending on a rate option of the CPRI signals, and wherein transmitting the recovered first and second characters comprises transmitting the communication frames, with the recovered first and second characters mapped therein, over an optical communication network.

15. The method according to claim 13, wherein mapping the first characters comprises mapping the input frames to payload areas of the communication frames, and setting in overhead fields of the communication frames pointers to at least some of the mapped input frames.

16. The method according to claim 15, wherein synchronizing to the input frames comprises identifying respective positions of the input frames within the payload areas of the communication frames using the pointers.

17. The method according to claim 13, wherein receiving the input frames comprises accepting the input frames from multiple CPRI sources, and wherein mapping the first characters comprises interleaving the recovered first characters using a predefined interleaving scheme that alternates among the CPRI sources.

18. The method according to claim 13, wherein mapping the first characters comprises adding multiple stuffing characters among the first characters using a predefined stuffing scheme, and wherein mapping the second characters comprises replacing the stuffing characters with the second characters.

19. The method according to claim 13, wherein recovering the second characters in the first communication interface comprises mapping the second characters recovered from the Ethernet frames into Generic Framing Procedure (GFP) frames, and wherein reconstructing the Ethernet frames in the second communication interface comprises de-mapping the second characters from the GFP frames.

20. An apparatus for communication, comprising:
a first communication interface, which is configured to:
receive input frames, which comprise data symbols that were derived by encoding respective first characters, and further comprise one or more synchronization symbols distinguishable from the data symbols,
receive Ethernet frames that encapsulate second characters,
recover the first characters from the data symbols and recover the second characters from the Ethernet frames,
map the first characters into Optical Transport Network (OTN) communication frames and discard the synchronization symbols, wherein the mapping is performed using a Bit-synchronous Mapping Procedure (BMP), while leaving locations in the OTN communication frames empty from carrying first characters, so that the rate of the first characters matches a desired rate of the OTN frames,
map the second characters into at least some of the locations in the OTN frames that carry no first characters, and
transmit the OTN communication frames carrying the mapped first characters and the mapped second characters; and
a second communication interface, which is configured to:
receive the OTN communication frames from the first communication interface,
extract the first and second characters from the communication frames by synchronizing to the input frames independently of the synchronization symbols, and reconstruct the input frames in the second communication interface, including the data symbols and the synchronization symbols, by re-encoding the extracted first characters, and further reconstruct the Ethernet frames by re-encapsulating the extracted second characters into the Ethernet frames.

21. The apparatus according to claim 20, wherein the data symbols are carried in Common Public Radio Interface (CPRI) signals and are derived from eight-bit characters using an eight-bit to ten-bit (8b/10b) encoding protocol or using a 64-bit to 66-bit (64b/66b) encoding protocol, depending on a rate option of the CPRI signals, and wherein the first communication interface is configured to transmit the recovered first and second characters by transmitting the communication frames, with the recovered first and second characters mapped therein, over an optical communication network.

22. The apparatus according to claim 20, wherein the first communication interface is configured to map the input frames to payload areas of the communication frames, and to set in overhead fields of the communication frames pointers to at least some of the mapped input frames.

23. The apparatus according to claim 22, wherein the second communication interface is configured to synchronize to the input frames by identifying respective positions of the input frames within the payload areas of the communication frames using the pointers.

24. The apparatus according to claim 20, wherein the first communication interface is configured to accept the input frames from multiple CPRI sources, and to interleave the recovered first characters using a predefined interleaving scheme that alternates among the CPRI sources.

25. The apparatus according to claim 20, wherein the first communication interface is configured to add multiple stuffing characters among the first characters using a predefined stuffing scheme, and to map the second characters by replacing the stuffing characters with the second characters.

26. The apparatus according to claim 20, wherein the first communication interface is configured to recover the second characters by mapping the second characters recovered from the Ethernet frames into Generic Framing Procedure (GFP) frames, and wherein the second communication interface is configured to reconstruct the Ethernet frames by de-mapping the second characters from the GFP frames.

* * * * *